US008014988B2

(12) United States Patent
Wahrmund et al.

(10) Patent No.: US 8,014,988 B2
(45) Date of Patent: Sep. 6, 2011

(54) METHOD FOR OBTAINING RESISTIVITY FROM CONTROLLED SOURCE ELECTROMAGNETIC DATA

(75) Inventors: Leslie A. Wahrmund, Kingwood, TX (US); Kenneth E. Green, Houston, TX (US); Dmitriy A. Pavlov, The Woodlands, TX (US); Leonard J. Srnka, Bellaire, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 539 days.

(21) Appl. No.: 12/280,330

(22) PCT Filed: Feb. 15, 2007

(86) PCT No.: PCT/US2007/004111
§ 371 (c)(1),
(2), (4) Date: Aug. 21, 2008

(87) PCT Pub. No.: WO2007/126481
PCT Pub. Date: Nov. 8, 2007

(65) Prior Publication Data
US 2010/0332198 A1 Dec. 30, 2010

Related U.S. Application Data

(60) Provisional application No. 60/789,781, filed on Apr. 6, 2006.

(51) Int. Cl.
*G06G 7/48* (2006.01)
*G06F 7/60* (2006.01)
*G06F 17/10* (2006.01)
*G01V 1/40* (2006.01)
*G01V 3/18* (2006.01)
*G01V 5/04* (2006.01)
*G01V 9/00* (2006.01)

(52) U.S. Cl. .......... 703/10; 703/2; 702/6; 702/7
(58) Field of Classification Search .......... 703/2, 10; 702/5; 324/339, 354, 348
See application file for complete search history.

(56) References Cited

U.S. PATENT DOCUMENTS
4,617,518 A 10/1986 Srnka
(Continued)

FOREIGN PATENT DOCUMENTS
WO WO 03/025803 3/2003
(Continued)

OTHER PUBLICATIONS

*International Search Report*, dated Oct. 4, 2007, PCT/US07/04111, filed Feb. 15, 2007.

(Continued)

*Primary Examiner* — Paul Rodriguez
*Assistant Examiner* — Cedric D Johnson

(57) ABSTRACT

Method for generating a three-dimensional resistivity data volume for a subsurface region from an initial resistivity model and measured electromagnetic field data from an electromagnetic survey of the region, where the initial resistivity model is preferably obtained by performing multiple 1D inversions of the measured data [100]. The resulting resistivity depth profiles are then registered at proper 3D positions [102]. The 3D electromagnetic response is simulated [106] assuming the resistivity structure is given by the initial resistivity model. The measured electromagnetic field data volume is scaled by the simulated results [108] and the ratios are registered at proper 3D positions [110] producing a ratio data volume [112]. A 3D resistivity volume is then generated by multiplying the initial resistivity volume by the ratio data volume (or some function of it), location-by location [114]. A related method emphasizes deeper resistive anomalies over masking effects of shallow anomalies.

20 Claims, 18 Drawing Sheets

U.S. PATENT DOCUMENTS

| | | | | |
|---|---|---|---|---|
| 5,077,697 | A | * | 12/1991 | Chang .............................. 367/31 |
| 5,210,691 | A | | 5/1993 | Freedman |
| 5,770,945 | A | | 6/1998 | Constable |
| 5,889,729 | A | | 3/1999 | Frenkel |
| 6,098,019 | A | * | 8/2000 | Hakvoort et al. ................. 702/7 |
| 6,115,670 | A | * | 9/2000 | Druskin et al. ................... 702/7 |
| 6,295,512 | B1 | * | 9/2001 | Bryant .......................... 702/189 |
| 6,591,194 | B1 | | 7/2003 | Yu |
| 6,603,313 | B1 | * | 8/2003 | Srnka ............................ 324/354 |
| 6,904,368 | B2 | * | 6/2005 | Reshef et al. ................... 702/17 |
| 7,333,893 | B2 | * | 2/2008 | Burtz et al. ..................... 702/14 |
| 7,383,132 | B2 | | 6/2008 | Green et al. |
| 7,502,690 | B2 | * | 3/2009 | Thomsen et al. ................. 702/2 |
| 2003/0050759 | A1 | | 3/2003 | Srnka et al. |
| 2005/0160814 | A1 | | 7/2005 | Vaganov et al. |
| 2005/0161489 | A1 | | 7/2005 | Pikulski |
| 2005/0170544 | A1 | | 8/2005 | Chang et al. |
| 2005/0190152 | A1 | | 9/2005 | Vaganov |
| 2006/0197534 | A1 | * | 9/2006 | Green et al. ................... 324/348 |

FOREIGN PATENT DOCUMENTS

| | | |
|---|---|---|
| WO | WO 2004/049008 | 6/2004 |
| WO | WO 2006/096328 | 9/2006 |
| WO | WO 2006/135510 | 12/2006 |
| WO | WO 2006/135568 | 12/2006 |
| WO | WO 2007/102973 | 9/2007 |

OTHER PUBLICATIONS

*International Search Report and Written Opinion*, dated Oct. 15, 2008, PCT/US07/04111, filed Feb. 15, 2007.

*European Search Report*, dated Aug. 11, 2006 (RS 113917).

Carazzone, J. et al. (2005) "Three Dimensional Imaging of Marine CSEM Data", *SEG Annual Meeting Extended Abstracts*, Houston, Texas, pp. 575-579.

Chew, W. C. et al (2004) "Review of Large Scale Computing in Electromagnetics With Fast Integral Equation Solvers," *CMES*, v.5, No. 4, pp. 361-372.

Constable, S. et al. (2006) "Mapping thin resistors and hydrocarbons with marine EM methods: Insights from 1D modeling," *Geophysics* v. 21, No. 2, pp. G43-G51.

Cui, T. J. et al. (2003) "3D Imaging of Buried Targets in Very Lossy Earth by Inversion of VETEM Data," *IEEE Trans. Geoscience Remote Sensing* 41, pp. 2197-2210.

Ellingsrud et al. (2002) "Remote Sensing of Hydrocarbon Layers by Seabed Logging (SBL): Results From a Cruise Offshore Angola," *The Leading Edge* 21, pp. 972-982.

Green et al. (2005) "R3M Case Studies: Detecting Reservoir Resistivity in Complex Settings", *SEG Annual Meeting Extended Abstracts*.

Mittet, et al. (2004) "Inversion of SBL Data Acquired in Shallow Waters", *EAGE* (*European Association of Geoscientists and Engineers*) *66th Conference & Exhibition*, 5 pages.

Newman, et al. (1997) "Three-Dimensional Massively Parallel Electromagnetic Inversion-I. Theory" *Geophys. J. Int.* 128, pp. 345-354.

Zhdanov, M. S. (2002) Geophysical Inverse Theory and Regularization Problems, Elsevier, Amsterdam—New York—Tokyo, pp. 300-310.

* cited by examiner

Resistivity (ohm-m)  
0.01  3

Depth (m)  
1000  3500

Depth (m)

0  4000

METHOD FOR OBTAINING RESISTIVITY FROM CONTROLLED SOURCE ELECTROMAGNETIC DATA

This application is the National Stage of International Application No. PCT/US2007/004111, filed on 15 Feb. 2007, which claims the benefit of now expired U.S. Provisional Application No. 60/789,781 filed on Apr. 6, 2006.

FIELD OF THE INVENTION

This invention relates generally to the field of geophysical prospecting, and more particularly to controlled source electromagnetic ("CSEM") prospecting, including field delineation. Specifically, this invention concerns the interpretation, analysis and resistivity volume construction of marine controlled-source electromagnetic ("MCSEM") data. It may be useful in the exploration for, characterization and subsurface mapping of reservoired hydrocarbons or other electrically resistive or conductive bodies of economic value, when using MCSEM. (See, for example, U.S. Pat. No. 6,603,313 to Srnka.)

BACKGROUND OF THE INVENTION

Controlled-source electromagnetic surveys are an important geophysical tool for evaluating the presence of hydrocarbon-bearing strata within the earth. CSEM surveys typically record the electromagnetic signal induced in the earth by a source (transmitter) and measured at one or more receivers. The behavior of this signal as a function of transmitter location, frequency, and separation (offset) between transmitter and receiver can be diagnostic of rock properties associated with the presence or absence of hydrocarbons. Specifically, CSEM measurements are used to determine the spatially-varying resistivity of the subsurface.

In the marine environment, CSEM data ("MCSEM" data) are typically acquired by towing an electric bipole transmitting antenna 11 among a number of receivers 12 positioned on the seafloor 13 (FIG. 1). The transmitter antenna is typically towed a few tens of meters above the seafloor. The receivers have multiple sensors designed to record one or more different vector components of the electric and/or magnetic fields. Alternative configurations include stationary transmitters on the seafloor or in the water column as well as magnetic transmitter antennae. Most MCSEM surveys are 3D surveys, i.e., more than one source towline is utilized. The transmitting and receiving systems typically operate independently (without any connection), so that receiver data must be synchronized with shipboard measurements of transmitter position by comparing clock times on the receivers to time from a shipboard or GPS (Global Positioning System) standard.

MCSEM data collected in deep water are typically interpreted in the temporal frequency domain, each signal representing the response of the earth to electromagnetic energy at that temporal frequency. In raw data, the strength of each frequency component varies depending on how much energy the transmitter broadcasts and on the receiver sensitivity at that frequency. These effects are typically removed from the data prior to interpretation. FIGS. 2A and 2B depict raw receiver data 21 together with (in FIG. 2B) the transmitter waveform 22 that gave rise to it. FIG. 2A shows examples of received CSEM signals on a time scale of several hours, while FIG. 2B shows the same received signal on a much shorter time scale, comparable to the period, T, of the transmitter waveform. Typical values for T are between 4 and 64 seconds. The transmitter waveform is depicted as a dashed line overlaying the receiver waveform. (The transmitter waveform is shown for reference only; the vertical scale applies only to the receiver signal.)

In practice, the receiver data are converted to temporal frequency by dividing (or "binning") the recorded time-domain data into time intervals equal to the transmitter waveform period (FIG. 3A) and determining the spectrum (FIG. 3B) within each bin ($x_1$, $x_2$, $x_3$) by standard methods based on the Fourier Transform. The phases of the spectral components are not shown. With each bin is associated a time, typically the Julian date at the center of the bin. Since the transmitter location is known as a function of time, these bins may be interchangeably labeled in several different ways including: by Julian date of the bin center; by transmitter position; by the signed offset distance between source and receiver; or by the cumulative distance traveled by the transmitter relative to some starting point.

The transmitter signal may be a more complex waveform than that depicted in FIGS. 2B and 3A.

MCSEM receivers (FIG. 4) typically include (see U.S. Pat. No. 5,770,945 to Constable):
- a power system, e.g. batteries (inside data logger and pressure case 40);
- one or more electric-field (E) or magnetic-field (B) antennae (bipoles 41 receive + and − $E_x$ fields, dipoles 42 + and − $E_y$, coils 43 for $B_x$ and coils 44 for $B_y$);
- other measuring devices, such as a compass and thermometer (not shown);
- electronics packages that begin sensing, digitizing, and storing these measurements at a pre-programmed time (inside case 40);
- a means to extract data from the receiver to a shipboard computer after the receiver returns to the surface (not shown);
- a weight (e.g., concrete anchor 44) sufficient to cause the receiver to fall to the seafloor;
- a mechanism 45 to release the receiver from its weight upon receiving (acoustic release and navigation unit 46) an acoustic signal from a surface vessel (14 in FIG. 1);
- glass flotation spheres 47;
- strayline float 48; and
- various (not shown) hooks, flags, strobe lights, and radio beacons to simplify deployment and recovery of the receiver from a ship at the surface.

Clearly, other configurations are possible, such as connecting several receivers in a towed array (see, for example, U.S. Pat. No. 4,617,518 to Srnka). The receiver depicted in FIG. 4 is a 4-component ($E_x$, $E_y$, $B_x$, and $B_y$) seafloor CSEM receiver. The devices can be configured to record different field types, including vertical electric ($E_z$) and magnetic ($B_z$) fields.

In general, the received signals are made up of components both in-phase and out-of-phase with the transmitter signal. The signals are therefore conveniently represented as complex numbers in either rectangular (real-imaginary) or polar (amplitude-phase) form. As shown in FIGS. 5 and 6, both the phase and amplitude of MCSEM data can be indicative of resistive (and potentially hydrocarbon-bearing) strata. Both the phase and amplitude must be accurately determined in order to distinguish signal characteristics associated with hydrocarbons from the much larger portion of the signal that is associated other geologic features of the subsurface. FIG. 5 shows a cross-section view of a typical MCSEM survey. The signal measured in a receiver 12 has contributions from many different paths through the subsurface, including paths associated with resistive (potentially hydrocarbon-bearing) strata such as 51. FIG. 6A shows Electric-field amplitude and FIG. 6B shows the corresponding phase responses that might result from the MCSEM measurements depicted in FIG. 5. The dashed curves show signals in the absence of the resistive unit 51. Signals in the presence of the resistive unit (solid curves) show a larger amplitude, as current is forced back toward the surface, and a delayed phase, due to the longer wavelengths of electromagnetic waves in the resistive unit.

Every CSEM signal frequency, ω, measured in radians per second is associated with a signal period, $T=2\pi/\omega$, measured in seconds. Any phase value, φ, or phase shift, Δφ, is associated with an equivalent time shift, Δt, by the formula $$\Delta\phi = 2\pi(\Delta t/T).$$

While phase is customarily measured as an angle between 0 and $2\pi$ radians, it can be equivalently thought of as a time between 0 and T seconds.

There are currently several approaches to analyzing MCSEM data. The most robust is full 3D inversion, which directly produces a 3D resistivity volume of the subsurface consistent with specified parameters, generally amplitude and phase of one or more measured components of the electric field at one or more frequencies. However, full 3D inversion is computationally intensive, requiring weeks or months of computer time on very large optimized systems. See PCT Patent Publication No. WO03/025803; and Carazzone, et al., "Three Dimensional Imaging of Marine CSEM Data", SEG (Society of Exploration Geophysicists) Annual Meeting Extended Abstracts (2005).

Approximate 3D inversion schemes can potentially be reasonably accurate and faster means to analyze MCSEM data. This approach includes three-dimensional inversions based on weak scattering approximations of electromagnetic integral equation modeling (M. S. Zhdanov, *Geophysical Inverse Theory and Regularization Problems*, Elsevier, Amsterdam—New York—Tokyo, 628 pp. (2002); and T. J. Cui, et al., "3D imaging of buried targets in very lossy earth by inversion of VETEM data," *IEEE Trans. Geoscience Remote Sensing* 41, 2197-2210 (2003)). These methods may not be readily available for industrial MCSEM applications and their efficiency in multi-source surveying may need to be confirmed.

Another approach to analyzing MCSEM data is iterative 3D forward modeling. In this approach, realistic detailed 3D geologic models are built for the reservoir and surrounding areas using seismic, petrophysical, and other subsurface information. The models are then simulated using forward 3D electromagnetic modeling, and modified until results consistent with electromagnetic, seismic, petrophysical, and/or other subsurface data are achieved (Green et al., "R3M Case Studies: Detecting Reservoir Resistivity in Complex Settings", SEG Annual Meeting Extended Abstracts (2005)). This approach can lead to an accurate definition of subsurface resistivity leading to direct hydrocarbon detection, but it is time-consuming and labor-intensive.

Another common approach to analyzing MCSEM data is 1D inversion of amplitude and/or phase of measured electric field data (Mittet, et al., "Inversion of SBL Data Acquired in Shallow Waters", EAGE (European Association of Geoscientists and Engineers) 66th Conference & Exhibition (2004)). This method can quickly generate 1D resistivity depth profiles for every receiver. However, this method only resolves 1D resistivity effects; it omits the 3D effects, which frequently are the effects of interest when applying MCSEM to detection or characterization of hydrocarbon reservoirs. The present invention employs 1D inversion, but includes additional features to overcome some of the limitations of this technique.

Another method to visualize and interpret MCSEM data is to normalize the recorded field data by a background electric field response (Ellingsrud et al., "Remote sensing of hydrocarbon layers by seabed logging (SBL): results from a cruise offshore Angola," *The Leading Edge* 21, 972-982 (2002)). Maps based on ratios of observed amplitudes and background values at a constant offset were generated. The background response is measured electric field data from a receiver away from the target.

Among non-CSEM techniques, U.S. Pat. No. 6,098,019 to Hakvoort et al. discloses a method for determining electrical resistivity of an earth formation in the vicinity of a wellbore from measurements made by a resistivity logging tool, taking into account invasion of wellbore fluid into the formation. Resistivities at varying radical distances are determined by inversion of the logging data, which is done by updating modeled resistivity profiles in an iterative manner. Updating in a given radial interval is done using a ratio of the resistivity log to the modeled log for that radial interval. The method results in a layered 2D model of resistivity as a radially symmetric function of r and z, where the z-dependence is directly provided by placement of the tool at various depths in the wellbore.

There is another approach based on normalized electric field responses to visualize and interpret MCSEM data (K. E. Green et al., "Method for identifying resistivity anomalies in electromagnetic survey data", U.S. Patent Publication No. US 2006/0197534). The data are displayed as amplitudes relative to background at all offsets along a towline, generating relative amplitude sections. This technique is called RASCAL by its inventors.

A method was developed by Burtz, et al., to interpret electromagnetic data using a layer-striping approach. The method begins by using high frequency data to model the shallow resistivity structure of the earth, and gradually models the earth to increasing depths by matching lower frequency data (PCT Patent Publication No. WO2006/096328). An embodiment of the present invention referred to herein as Shallow Background Model mapping is an alternative means of mapping resistive anomalies below shallow resistive bodies. It is a rapid approach, which can be done without reference to seismic, borehole, or other conventional subsurface data, and does not rely on iterative 3D forward modeling or full 3D inversion.

SUMMARY OF THE INVENTION

In one embodiment, the invention is a method for generating a three-dimensional (3D) resistivity model for a subsurface region from one-dimensional (1D) inversion of measured electromagnetic field data from a controlled-source electromagnetic survey of the region, where the method comprises:

(a) generating an initial resistivity data volume for the subsurface region through 1D (vertical dimension) inversion of the measured electromagnetic field data;

(b) solving Maxwell's electromagnetic field equations in three dimensions, assuming the initial resistivity data volume and a selected frequency from the survey source's frequency spectrum, for selected source/receiver locations from the survey, thereby producing calculated electromagnetic field values corresponding to measured survey data;

(c) decomposing the measured data to the frequency domain and selecting the component of the data corresponding to the selected frequency;

(d) dividing a measured field value from the selected data component by a calculated field value (preferably the value from step (b) for the same source/receiver pair), for different source-receiver pairs along a plurality of source towlines, yielding a set of ratios;

(e) assigning an (x,y,z) position to each ratio, in consideration of the locations of the source and receiver pair associated with each ratio, thereby creating a ratio data volume; and (f) multiplying the initial resistivity data volume by the ratio data volume or some function of it, location-by-location, to generate a 3D resistivity model corresponding to the selected frequency.

The initial resistivity data volume may be updated with the 3D resistivity model from the last step, and the cycle of steps repeated until the resistivity model converges to within a specified criterion or some other stopping point is reached.

In a different but closely related embodiment, the invention provides a method for emphasizing deeper resistive anomalies over masking effects of shallow resistive anomalies arising in the measured electromagnetic field data from a controlled-source electromagnetic survey of a subsurface region, where the method comprises:

(a) decomposing the measured data into components in the frequency domain;

(b) selecting one or more data components corresponding to frequencies higher than a minimum frequency, said minimum frequency being chosen to provide a pre-selected degree of shallow penetration of said subsurface region;

(c) generating an initial resistivity data volume for the subsurface region through 1D (vertical dimension) inversion of the selected high frequency components of the measured electromagnetic field data;

(d) solving Maxwell's electromagnetic field equations in three dimensions, assuming the initial resistivity data volume and a selected low frequency from the survey source's frequency spectrum, for selected source/receiver locations from the survey, said low frequency being selected for its ability to penetrate to a pre-selected depth in the subterranean region thereby producing calculated electromagnetic field values;

(e) dividing a measured electromagnetic field value from the frequency-domain data component associated with the selected low frequency by a calculated electromagnetic field value (preferably the value from step (d) for the same source/receiver pair), for different source-receiver pairs along a plurality of source towlines, yielding a set of ratios;

(f) assigning an (x,y,z) position to each ratio, in consideration of the locations of the source and receiver pair associated with each ratio, thereby creating a ratio data volume; and (g) defining resistive objects in the ratio data volume by selecting cells in the volume having scaled values above a pre-selected threshold.

In the case of either embodiment, the initial resistivity data volume may be generated from one or more 1D resistivity depth profiles, each profile computed by performing a one-dimensional electromagnetic inversion calculation, said inversion being solving Maxwell's electromagnetic field equations using measured data from the survey and survey source and receiver locations and source parameters, with resistivity as a function of vertical position being the unknown quantities in the calculation.

It may be noted that the two example embodiments set forth above arise out of a single inventive concept whose features include (1) using 1D inversion of measured data to generate an initial resistivity model; (2) simulating the initial resistivity model in 3D; (3) scaling the measured EM field values, preferably using the corresponding simulated field values; and (4) posting each scaled value or ratio in relation to the associated source/receiver positions.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a one-dimensional inversion technique for rapid generation of a quasi 3D resistivity data volume from MCSEM data. The method is based on scaled resistivity profiles generated from single or multi-frequency 1D inversion of electromagnetic field amplitude and/or phase measurements. The present invention addresses the need for rapid analysis and resistivity volume construction of MCSEM data. Many of the current interpretation methods, including full 3D inversion and iterative forward modeling, are robust, but computationally and/or time intensive mainly due to the size of the computational domain and the extremely large number of source locations. Other methods, such as 1D inversion or simple data normalization, are not robust, and could misrepresent 3D subsurface resistivities in certain instances. The present inventive method employs 1D inversion, but contains additional features to overcome some of the limitations of this technique.

Rapid analysis and visualization potentially allows real-time MCSEM hydrocarbon prospecting, in which surveys can be expanded or modified during acquisition in order to target areas where electrical anomalies are found, the subject of another recent PCT Patent Publication by Wahrmund et al. (WO2006/135568) Rapid analysis and 3D visualization of MCSEM data is also potentially useful in subsurface characterization and mapping, given the time-sensitive nature of hydrocarbon exploration and production.

Figure 1:
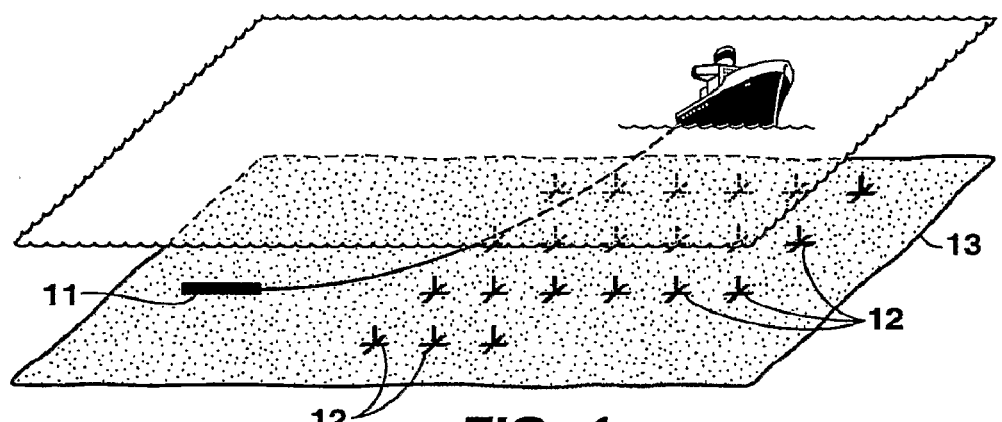
FIG. 1 illustrates deployment of equipment for a typical CSEM survey.
Figure 2A:
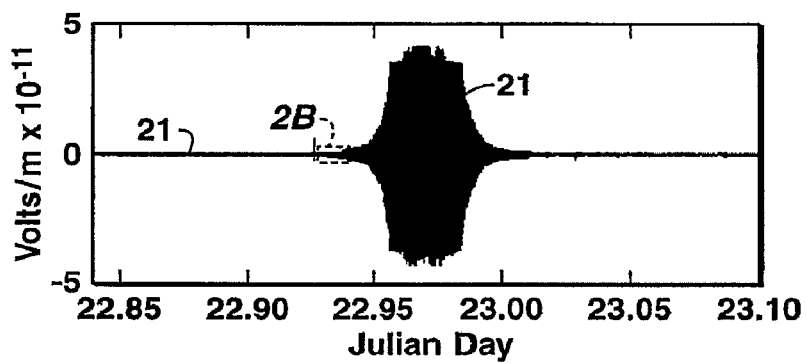
FIGS. 2A and 2B depict a received CSEM signal and the transmitter waveform that gave rise to it as functions of time.
Figure 2B:
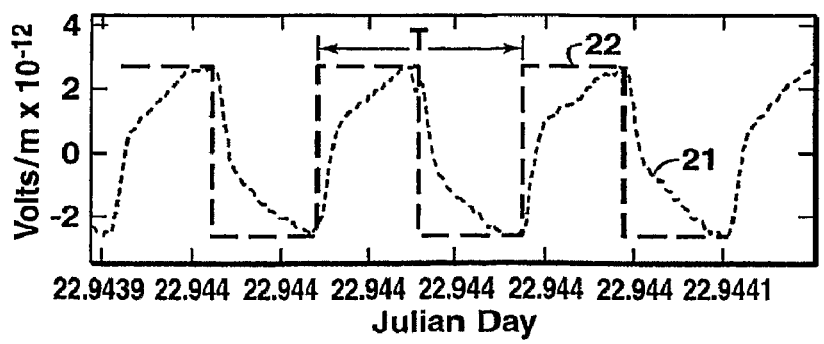
Figure 3A:
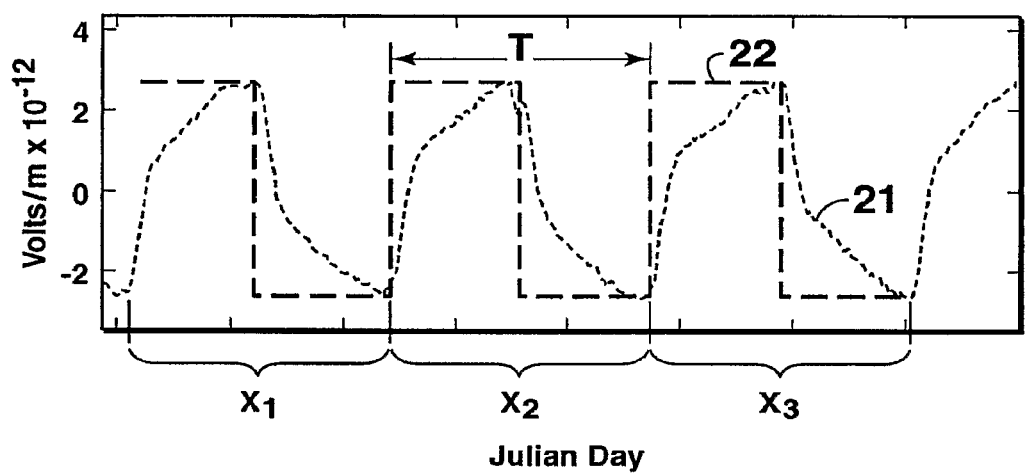
FIGS. 3A and 3B illustrate the process of binning a receiver signal in time and determining the frequency spectrum within each time bin by Fourier analysis.
Figure 3B:
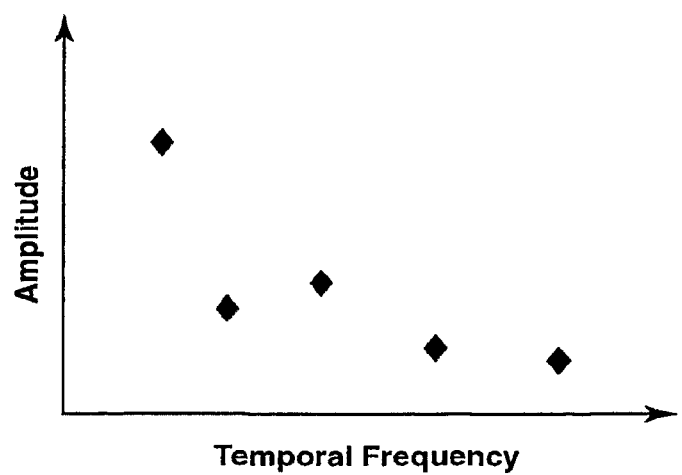
Figure 4:
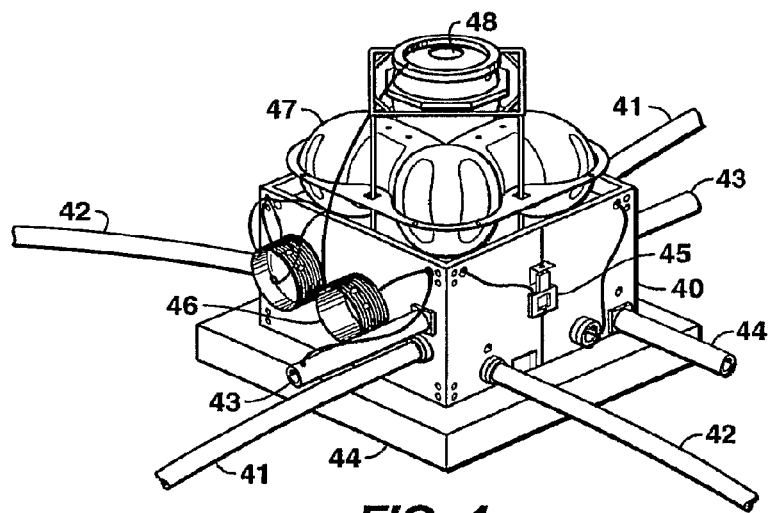
FIG. 4 depicts a 4-component ($E_x$, $E_y$, $B_x$ and $B_y$ seafloor CSEM receiver.
Figure 5:
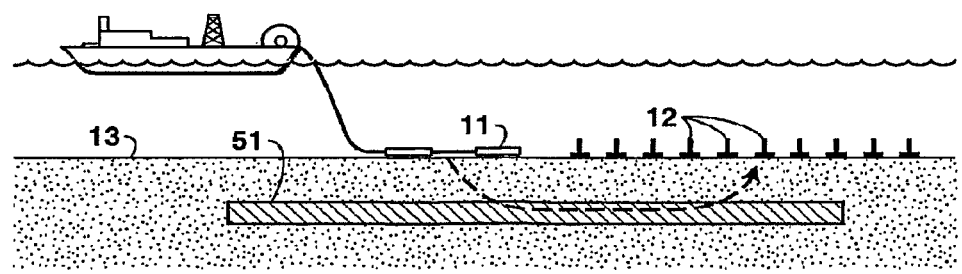
FIG. 5 shows a cross-section view of a typical MCSEM survey.
Figure 6A:
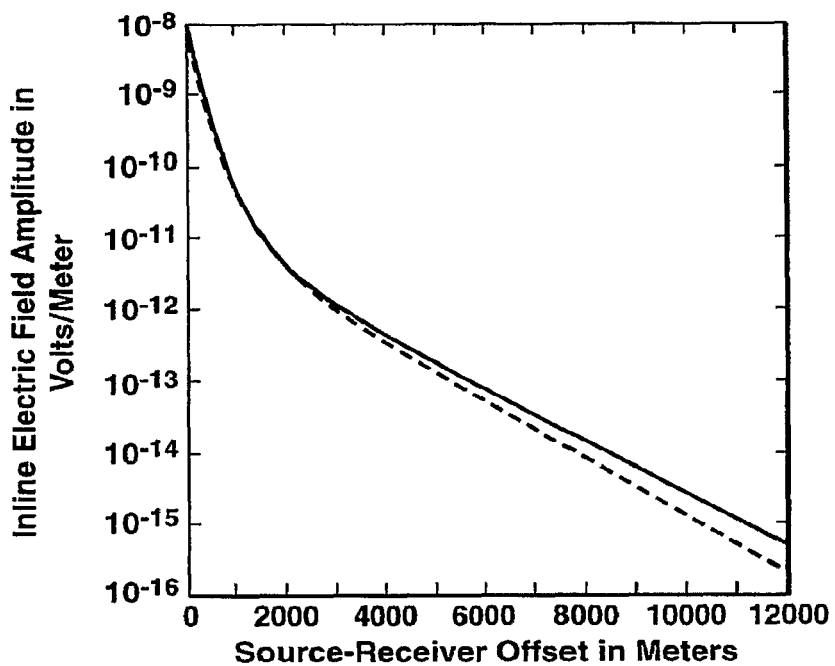
FIGS. 6A and 6B show Electric field amplitude (FIG. 6A) and phase (FIG. 6B) responses associated with typical MCSEM measurements.
Figure 6B:
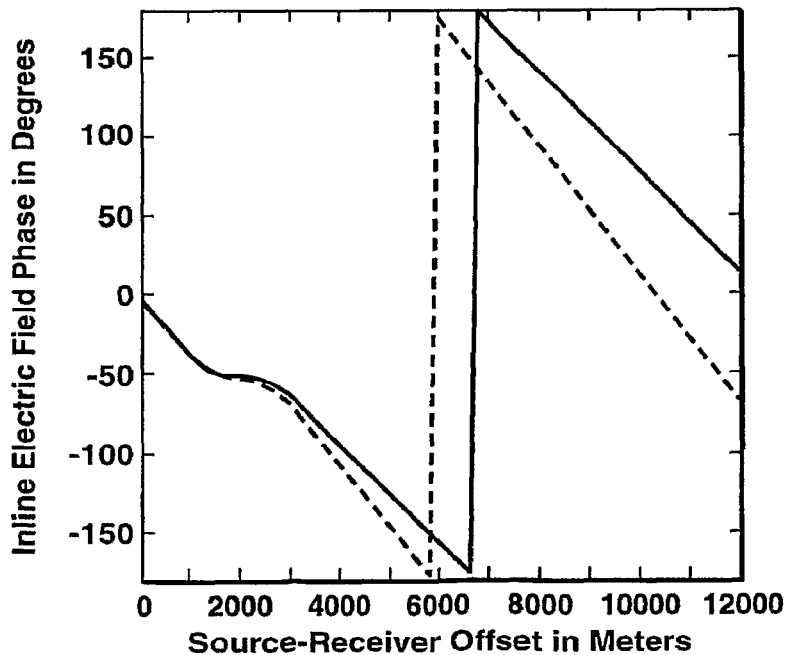
Figure 7:
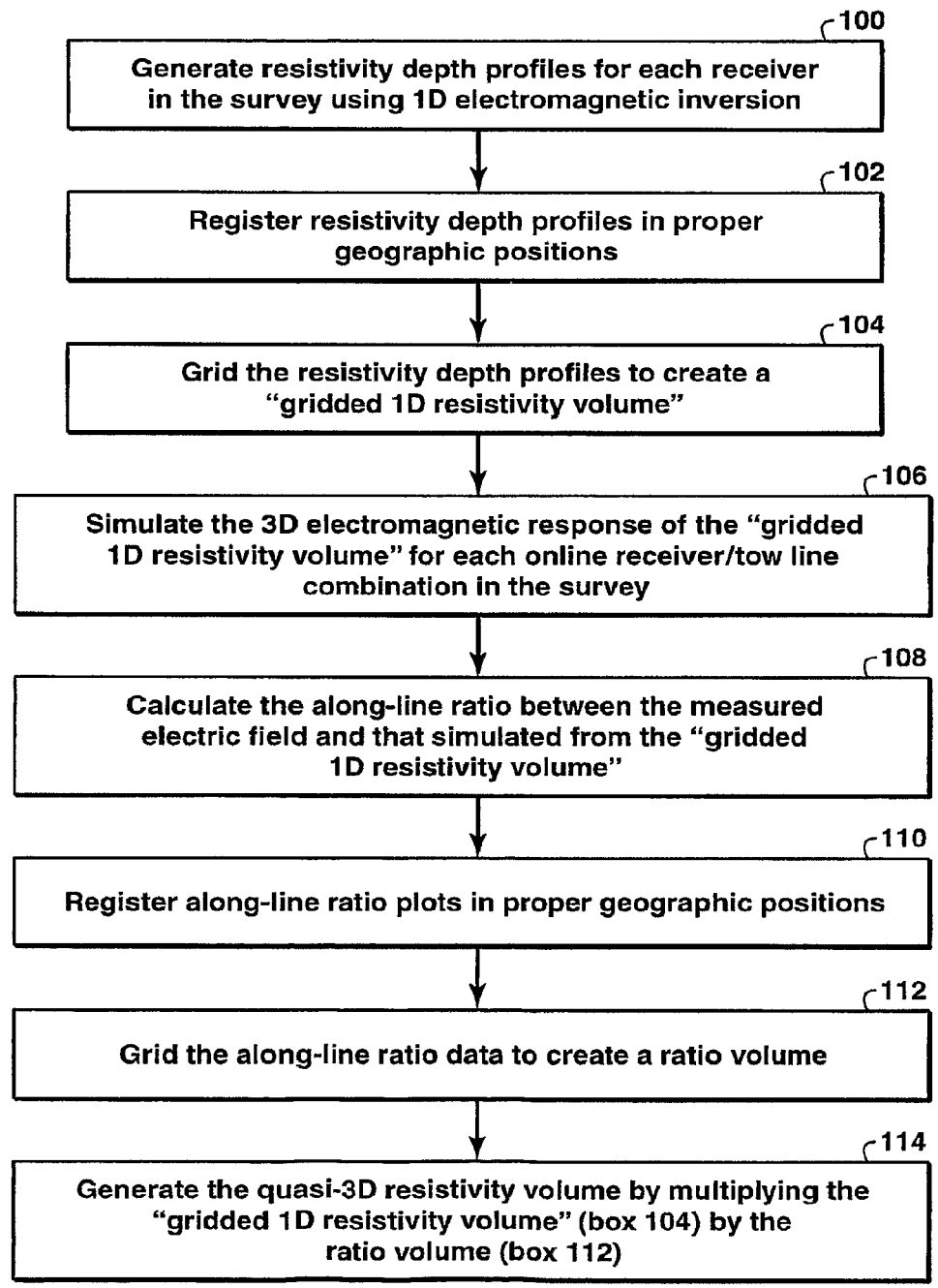
FIG. 7 is a flow chart showing basic steps in one embodiment of the present inventive method for generating a quasi-3D resistivity volume from MCSEM data.

The present inventive method for rapid analysis and visualization of MCSEM data requires no a priori knowledge of geology of the area, and can be rapidly executed by anyone skilled in the art. FIG. 7 summarizes basic steps required to generate a quasi-3D resistivity volume from MCSEM data using one embodiment of the present inventive method. Typically, resistivity depth profiles are first generated using multi-frequency 1D inversions of amplitude and phase for the fundamental frequency and several higher harmonics. These resistivity profiles are then gridded to create a resistivity depth volume. The resistivity depth volume is then scaled by the ratio between the measured amplitude and/or phase and 3D electromagnetic simulation of amplitude and/or phase of the resistivity depth volume. The scaling is done sequentially at the fundamental frequency and repeated for each of several higher harmonics.

In more detail, as shown in FIG. 7, step 100, a resistivity depth profile is first generated for each of the two offset directions (one direction where the source approaches the receiver, and the second direction where the source goes away from the receiver) for every online receiver/towline combination in the survey (or for a selected one or more receivers), using 1D electromagnetic inversion. That is, each inversion computation is performed using only the indicated survey data. For grid-style surveys, with both "north-south" and "east-west" towlines traversing each receiver, four resistivity depth profiles are preferably generated for each receiver: "north," "south," "east" and "west." 1D inversion may be performed using standard methods well known in the art. See, for example, Mittet et al., "Inversion of SBL Data Acquired in Shallow Waters", *EAGE 66th Conference & Exhibition* (2004). Typically, simultaneous, single or multi-frequency, unconstrained inversion is used. The 1D inversion computations for the present document were performed using a modified version of a 1D forward modeling code licensed from the University of Wisconsin. In this inversion step, Maxwell's electromagnetic field equations are solved to yield the 1D resistivity model that is consistent with measured field data from the CSEM survey, using the specific locations of source and receivers and the source transmission parameters. Persons skilled in the art will be able to write a software program that will perform this operation by numerical methods. Preferably, 1D inversions are run using horizontal ($E_x$ (inline) and $E_y$ (cross-line)) and vertical ($E_z$) amplitude and phase values of the measured electric field (but the inversion may be performed with either more or less data, including measurements of one or more magnetic field components). The inversion is preferably performed once, using all selected frequencies (typically the fundamental frequency and several higher harmonics), because the process will be more robust with the additional data. Electromagnetic measurements of vertical fields and phase are currently difficult to measure reliably; 1D multi-frequency inversions of inline horizontal amplitude can be substituted. Online receivers are defined to be configurations where the MCSEM 1D assumptions are potentially valid, that is where a MCSEM tow line passes within about 7-8 km, preferably within about 1000 m, of the (x,y) position above a MCSEM receiver resting on the seafloor.

Next, at step 102, two or more 1D resistivity depth profiles are registered in their proper geographic positions (x,y,z). Because the spatial sampling characteristic of MCSEM is typically large (hundreds to thousands of meters, depending on acquisition frequency and the resistive character of the earth), there is some flexibility in where the data can be displayed. For example, the 1D resistivity profiles from the two opposing offsets (±s. where s is distance from source) of a receiver can be displayed vertically hundreds of meters to either side of a receiver. (These two profiles sample different parts of the earth and often are very different.) Thus, for grid-style surveys, each of four separate profiles is positioned on its appropriate towline, several hundred meters "north," "south," "east" or "west" from the actual receiver location. Alternatively, for example, the resistivity depth profiles can be displayed using the inverted "V" plot format used in the data sections as disclosed in the RASCAL patent publication, where zero depth is plotted at the receiver location, and depths are scaled by offset. In such a data display, depths are often plotted at half-offset values.

At step 104 of FIG. 7, the 1D resistivity profiles are gridded using standard techniques to create a "gridded 1D resistivity volume." In other words, the volume of interest is subdivided into cells, and a discrete value of resistivity is assigned to each cell, as a pre-requisite to performing the inversion calculation by numerical methods. The gridded 1D resistivity volume will have a lateral resolution based on frequency content of the survey and receiver spacing. Thus, to define cells to be smaller in lateral extent than the resolution capability of the data would increase computer time with no increase in accuracy of the calculation. The gridded 1D resistivity volume will have a vertical resolution derived from the 1D inversion layering. Variations between receivers and between different offsets of the same receiver may be smoothly represented in a global model over the survey area. It should be noted that the "gridded 1D resistivity volume" is not typically a true 1D model because it is composed of multiple resistivity profiles that are truly one-dimensional, gridded at their respective (x,y) positions. Since the 1D profiles will typically vary, the resulting resistivity data volume will vary with (x,y) position as well as with the z-coordinate. Only in the unpreferred embodiment of the invention where the resistivity volume is formed by using a single 1D resistivity profile will the resistivity volume be truly 1D.

Next, at step 106, the three-dimensional (3D) electromagnetic response of the gridded 1D resistivity volume is simulated for each receiver/online tow line combination in the survey (or for a selected one or more receivers) using 3D forward electromagnetic modeling. In other words, for a certain survey receiver location, Maxwell's equations are solved (for the EM fields) with the survey source assumed to be at one online source location (source locations being typically discretized by data binning or similar technique for a survey with a continually moving source). Then, this computation is repeated for other online source positions. Then, the preceding computations are performed for another receiver position on the same source line. (Alternatively, the amount of computation may be reduced by interchanging—for computational purposes—source and receiver positions if the conditions for the Reciprocity Principle are satisfied, as disclosed by U.S. Patent Application 60/780,232. Thus, in this simulation step, Maxwell's field equations are solved for a problem defined by the survey source and receiver locations, the source parameters including a selected frequency from the source's frequency spectrum, and the gridded 1D resistivity volume. Sandia National Laboratories has developed software to conduct 3D frequency-domain electromagnetic simulation based on the massively parallelized finite difference approach of Newman and Alumbaugh published in *Geophys. J. Int.* 128, 345-354 (1997). Preferably, all electromagnetic field components and frequencies used in the 1D inversions are simulated, particularly those that are most sensitive to the presence of resistive bodies at target reservoir depths. Relative sensitivities can be determined by simulating a 3D forward model of potential reservoir responses, and examining the response of various frequencies and components. PCT Patent publication WO2004/049008 provides some guidance on what components may be most sensitive, and PCT Patent Publication No. WO2006/135510 provides some guidance on what components may be most affected by anisotropy.

At step 108, the "along-line" ratios between the phase of the measured electric field (assuming electric field phase data are used) and that of the electric field simulated from the gridded 1D resistivity volume are calculated for a plurality of (preferably all) receiver/tow line combinations for each target frequency of interest. This is similar to the scaling disclosed in the RASCAL patent publication, which discloses the concept of analyzing the ratio between the measured and the reference data at several or all useful offsets, rather than at a single offset. Thus, for a given receiver location, the ratio of the measured EM field quantity to the same quantity from the simulation is computed at preferably each source point (but in any event, more than one) along the towline. In preferred embodiments of the present invention, ratios of phase are used. However, since stable electromagnetic measurements of phase can be difficult to obtain, ratios of amplitude can be substituted. Variations on the choice of reference field values to use in the denominator for calculating the ratios (scaled field values) will be apparent to those skilled in the art. The present invention includes all such variations as long as the ratios at several or all offsets along each source line (denoted herein by along-line) are used, including but not limited to the suggestions in the RASCAL publication for scaling using simulated data. It may be noted that when the simulated electric fields using the gridded 1D resistivity model from step 100 are used as reference values (a preferred embodiment of the present invention), this preferentially enhances resistive anomalies that cannot be modeled in 1D over anomalies that are fully modeled in 1D.

Figure 15:
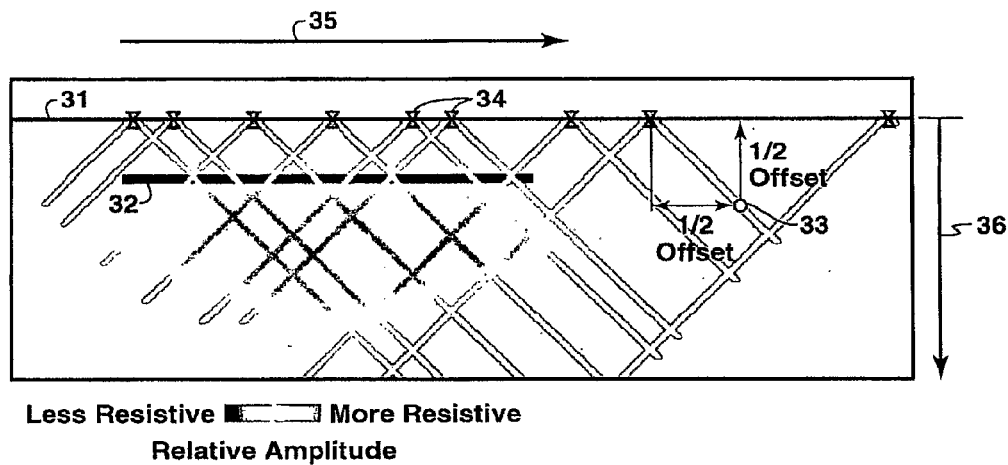
FIG. 15 is a black and white reproduction of a colored RASCAL display of scaled EM field data for one source towline.
Figure 16:
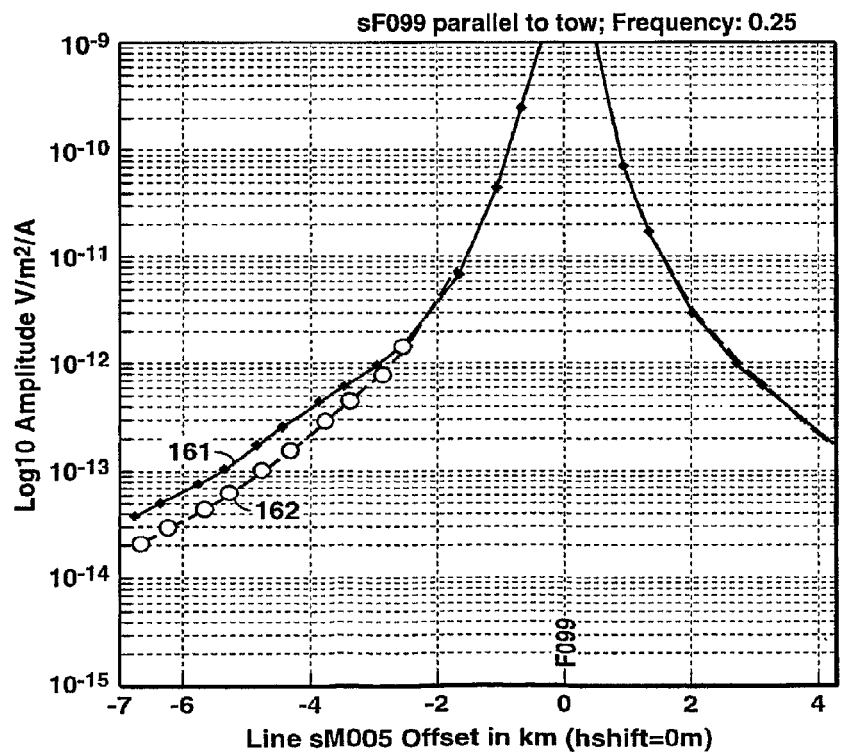
FIG. 16 is a RASCAL display showing measured EM data from one receiver, and corresponding reference data.

Next, at step 110, the scaled electromagnetic field data values are registered or posted at corresponding spatial positions. (As used herein, scaled does not imply a single scaling factor for all data.) The spatial positions are preferably selected as in the RASCAL patent publication. For example, zero-offset ratio data are placed at receiver locations, with ratio plotting continuing below tow lines at depth equal to half transmitter/receiver offset, resulting in inverted V style plots such as FIG. 15. This process is illustrated in more detail for a single receiver located at position (along the source towline) labeled x=0 in FIG. 16. The EM field quantity (electric field amplitude at 0.25 Hz in the case of this drawing) measured by the receiver is plotted at the location of the source when the measurement was taken. Curve 161 connects these data points. The other curve is the reference quantity, such as the simulated electric field amplitudes from step 106 for this receiver location and the various source locations along the line. At each source point, the ratio of measured quantity to reference quantity is computed. For offsets above about −2 km, the two curves essentially coincide, and therefore the ratio is unity. Each ratio is registered at its corresponding source point. For example, reference value 162 is approximately $6\times10^{-14}$, and the corresponding measured value is approximately $1\times10^{-13}$, so a ratio of 1.67 would be registered at about 5.2 km before the particular receiver along the source line, and at a depth equal to 2.6 km. Persons skilled in the art will realize that the RASCAL method of registering ratios at specific (x,y,z) positions, while logical, is also somewhat arbitrary, allowing other choices without disrupting the fabric of the invention. Alternative positions should bear a reasonable relationship to the locations of the source and receiver of the associated source-receiver pair, and to the portions of the subsurface being sampled by the particular source/receiver locations. It has been observed, however, that the one-half offset depth posting provides a good approximation to both observed and modeled results regardless of the source frequency. Different files are made for ratios generated from each frequency of interest in the spectrum of the signal transmitted by the electromagnetic source. In FIG. 15, the data lines form inverted V's with the apex indicating the receiver true location 34 along the towline. The horizontal scale is true distance 35 along the towline (the receivers are located at their true geographic coordinates), and the vertical scale is depth 36 below the water bottom 31. Displaying the data in this manner allows direct comparison to a seismic depth section or a geologic section. The scaled field measurements are preferably represented by a user-designed color coding. (The resistivity body that was assumed for the simulation that generated FIG. 15 was located at 32, which is near the upper boundary of the most resistive area in the color display.)

Figure 10A:
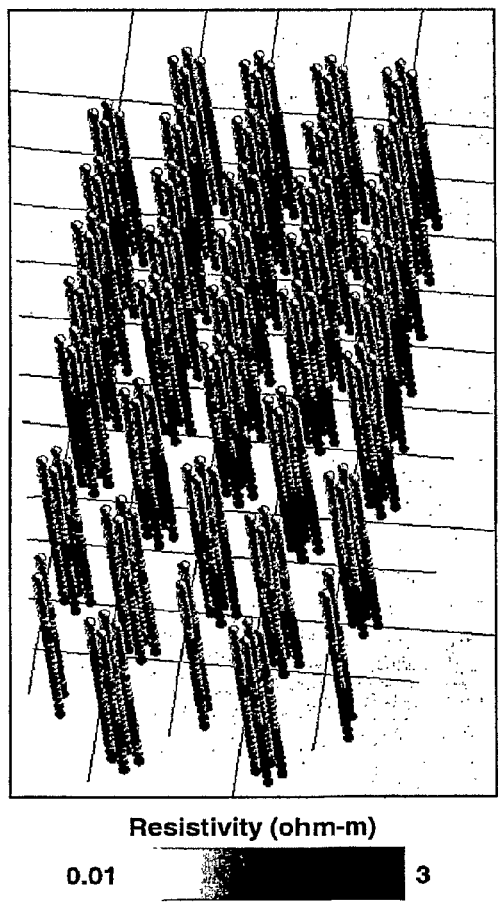
FIG. 10A illustrates resistivity profiles from 1D inversions for various receiver/towline combinations using model data, gridded to form a 1D resistivity model.
Figure 10B:
FIG. 10B illustrates a map view where the most resistive bodies from FIG. 10A are extracted.
Figure 10C:
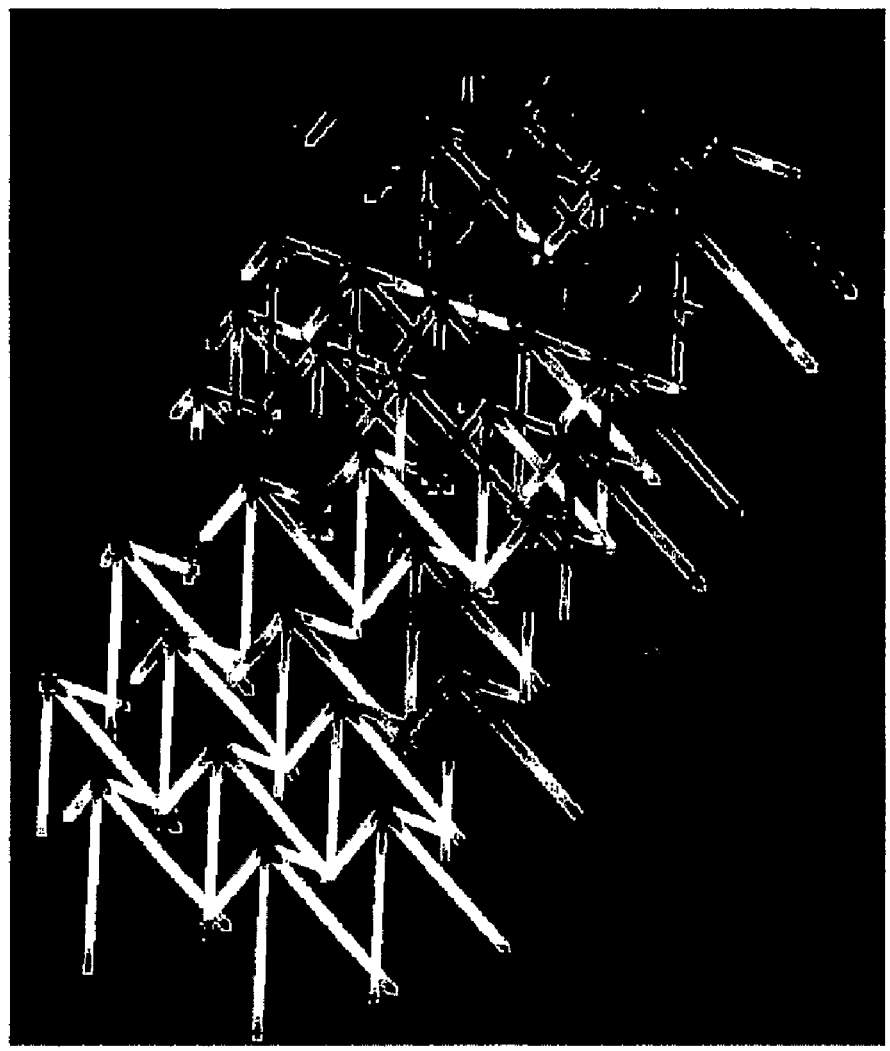
FIG. 10C illustrates along-line ratio plots (scaled EM field values) gridded to show the scaled values in their proper geographic positions.
Figure 10C:
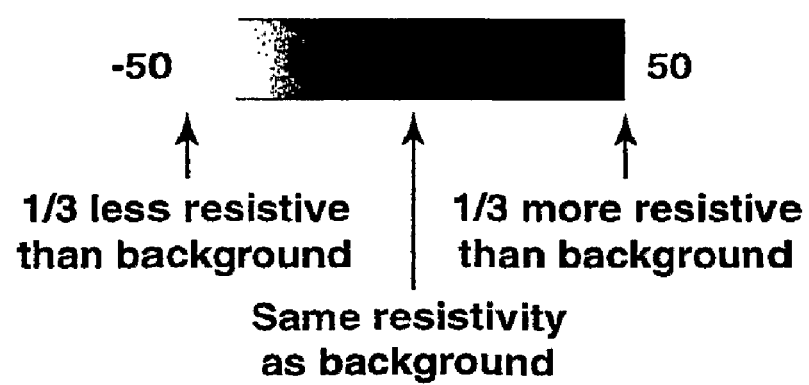

Next, at step 112, the ratio data, such as that shown in FIG. 10C, is gridded using standard techniques such as interpolation to form a RASCAL ratio volume. A different volume is generated for each frequency.

Finally, at step 114, what may be termed a quasi-3D resistivity volume is generated by multiplying (location-by-location) the gridded 1D resistivity volume (ohm-m) from step 104 by the dimensionless ratio volume from step 112 for a particular frequency. More generally, a gridded 1D resistivity value may be multiplied by some function of the corresponding dimensionless ratio, for example a constant times the ratio, or the ratio squared (or the ratio itself). Many of the differences between the gridded 1D resistivity volume and the measured data are due to 3D resistivity effects that cannot be modeled using 1D inversion. By multiplying the gridded 1D resistivity volume from step 104 by the dimensionless ratio volume from step 112 for a particular frequency, the inventive method approximates 3D response in the style of a Born approximation. This accentuates resistivity anomalies where 1D inversion underestimates resistivity values, maintains resistivity anomalies which are fully modeled in 1D, and suppresses resistivity anomalies where 1D inversion overestimates resistivity values. The procedure outlined in FIG. 7 may be repeated for each relevant frequency. (The inversion does not need to be repeated, as stated above, but the simulation necessarily must be done one frequency at a time.) Each frequency best detects a different depth range, as predicted by electromagnetic skin depth theory. Higher frequencies detect shallower reservoirs and lower frequencies detect deeper reservoirs, within the applicability range of the method. The process may be repeated iteratively, that is taking the quasi-3D resistivity volume as a new gridded 1D resistivity volume, simulating the quasi-3D resistivity volume in 3D, calculating the ratio between this simulation and the measured data, and multiplying the gridded 1D resistivity volume by the ratio or a function of the ratio.

Example

Figure 8A:
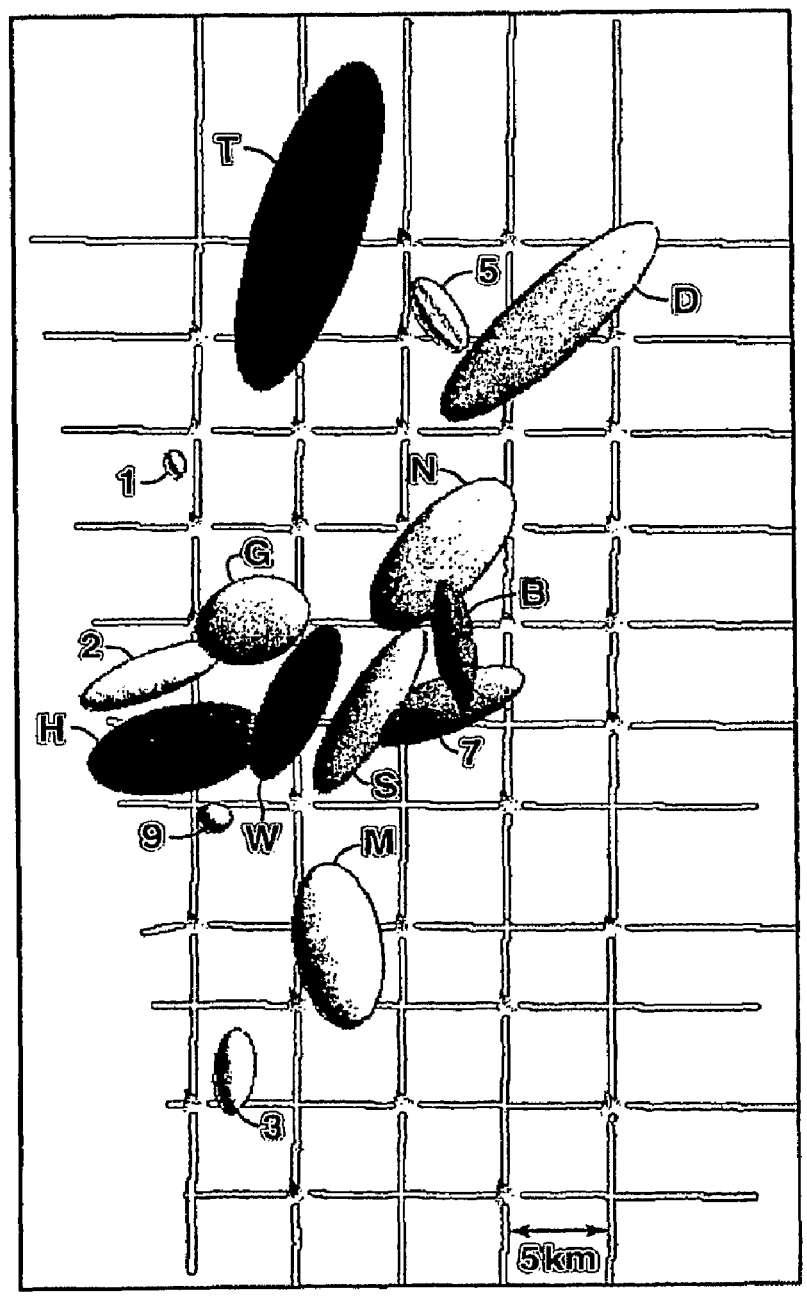
FIGS. 8A-B are map view depictions of resistive bodies included in the 3D earth model used for an example calculation.
Figure 8B:
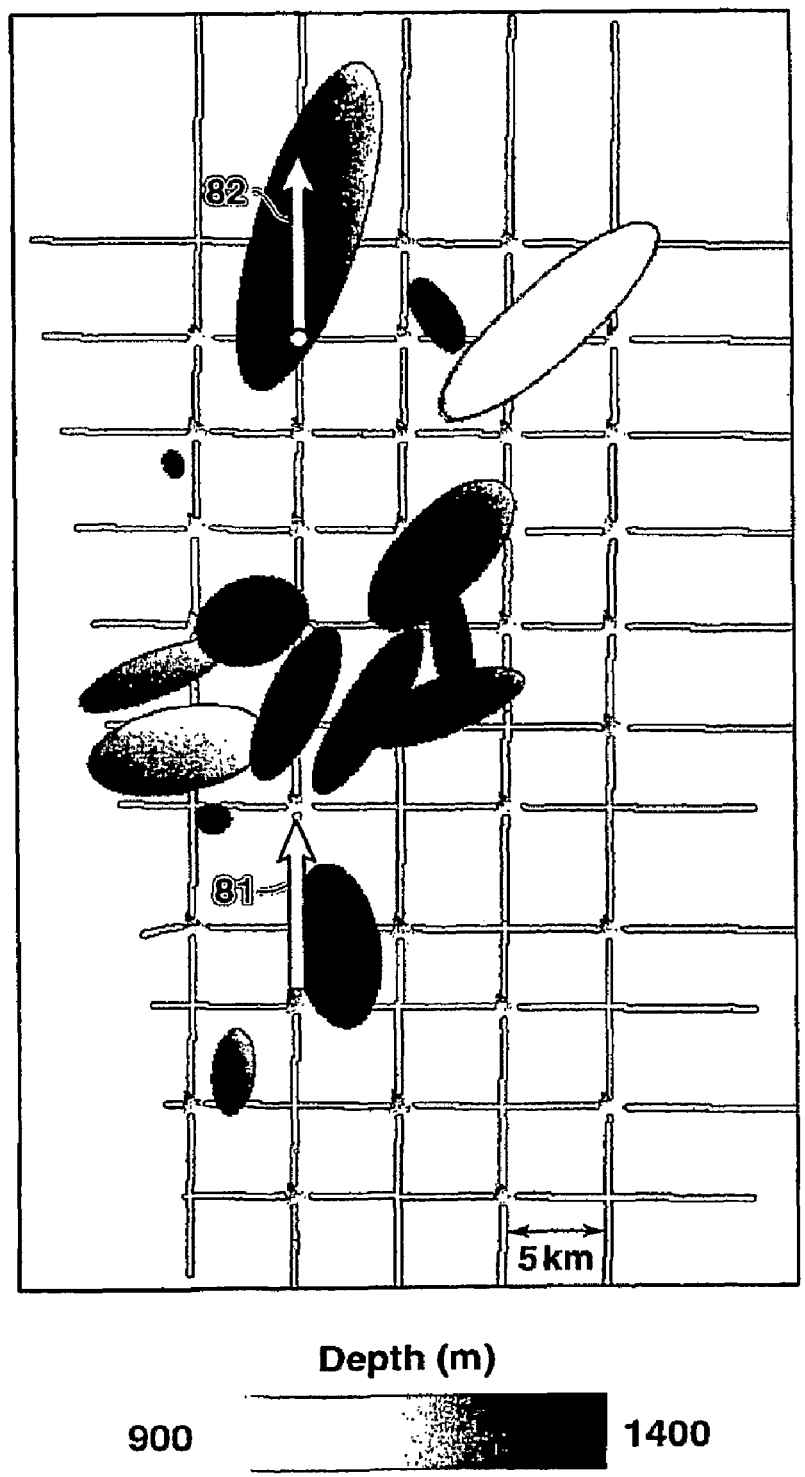

A 3D earth model, containing 15 resistive bodies meant to represent hydrocarbon reservoirs, was built and simulated using 3D forward electromagnetic simulation. FIGS. 8A and 8B are map-view depictions of the resistive bodies (1, 2, 3, 5, 7, 9, B, D, G, H, M, N, S, T, and W) included in the 3D earth model. Resistive thicknesses of the bodies are depicted in grey-scale in FIG. 8A, with resistive thicknesses increasing from 1000 ohm-$m^2$ (white) to 3500 ohm-$m^2$ (black). The depths below the seafloor are depicted in grey-scale in FIG. 8B, with depths increasing from 900 m (white) to 1400 m (black). The model was simulated using 3D electromagnetic simulations for a grid-style survey consisting of 16 towlines and 39 receivers, based on an actual survey.

Figure 9A:
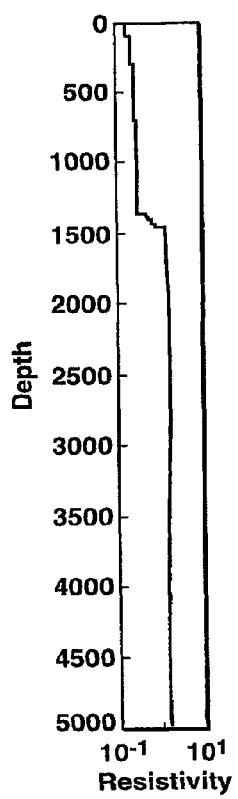
FIGS. 9A and 9D are 1D resistivity inversion depth profiles using data from a background receiver and a reservoir receiver, respectively.
Figure 9B:
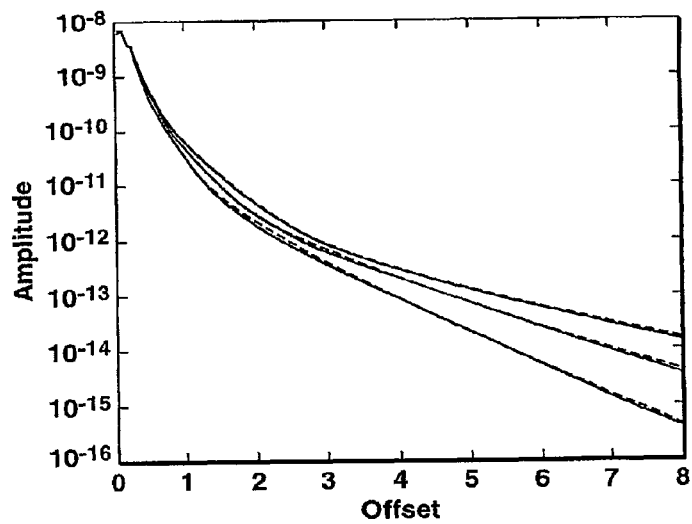
FIGS. 9B, 9C, 9E and 9F show the data used for the inversions and the results of forward modeling the inversion profiles, for three different source frequencies.
Figure 9C:
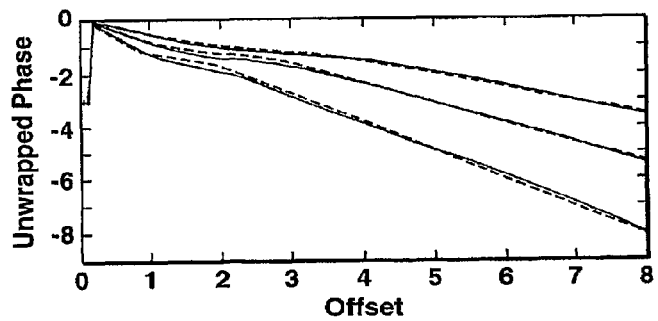

First, resistivity depth profiles for each receiver in the model survey illustrated in FIGS. 8A-B were generated from the simulated survey EM data, consistent with step 100 of FIG. 7. FIGS. 9B and 9C show MCSEM 1D inversion products from two receivers, at three different frequencies (⅛, ¼ and ½ Hz). FIG. 9A is a resistivity depth profile from the northern (upper, in the drawing) offset of receiver 81 shown in FIG. 8B. This receiver is typical of a "background receiver". The input data used for the 1D inversion from receiver 81 are shown by the black diamonds in FIGS. 9B and 9C on standard amplitude vs. offset and phase vs. offset plots, respectively. 1D forward modeling of this receiver, shown by the solid lines in the drawings, is typical for a background receiver, in that the 1D resistivity vs. depth profile shows a lack of resistive anomalies, and that 1D forward modeling of the resistivity depth profile (of FIG. 9A) closely matches the original data at all relevant frequencies.

Figure 9D:
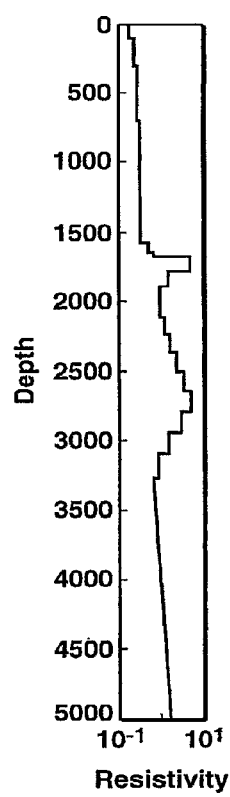
Figure 9E:
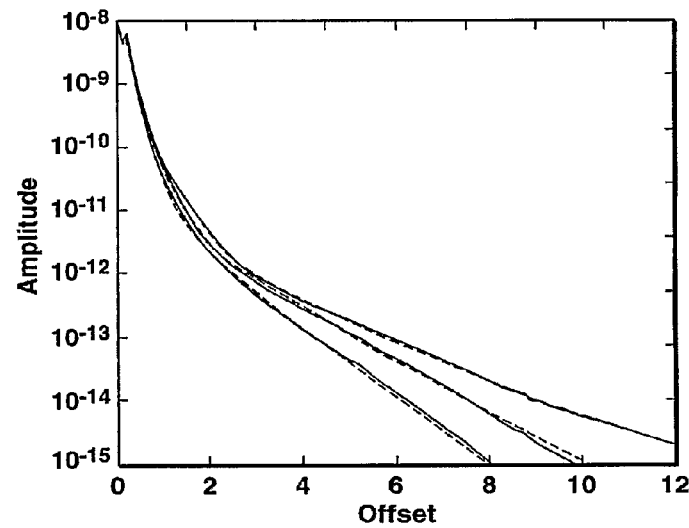
Figure 9F:
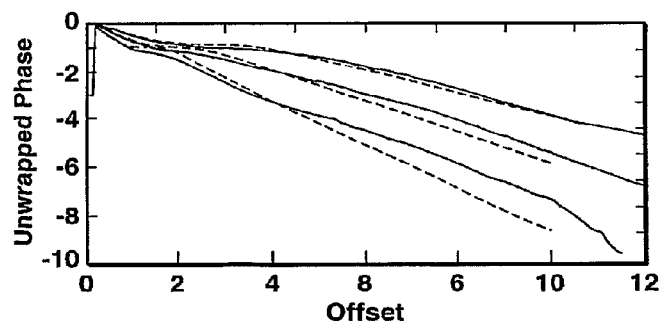

FIGS. 9D, 9E and 9F show similar plots for a "reservoir receiver," receiver 82 shown in FIG. 8B. 1D forward modeling of this receiver is typical for a reservoir receiver. The 1D resistivity depth profile shows elevated resistivities, and 1D forward modeling of the resistivity depth profile underestimates the input amplitude and phase data. This is due in part to the fact that 1D inversion of the original model data does not recover 3D effects.

Next, as called for in step 102 of the flow chart of FIG. 7, the resistivity depth profiles were registered to their proper geographic positions. FIG. 10A shows resistivity depth profiles generated from 1D inversion of receiver/tow line combinations in the model data. Resistivity values are depicted in grey-scale, with values near 0 ohm-m shown in white and values near 3 ohm-m shown in black. The resistivity depth profiles are laterally offset in depth several hundred meters from receiver locations to account for the fact that signal recorded at a receiver represents a signal path extending laterally between the receiver and the source position at that time.

Next, in accordance with step 104, a gridded 1D resistivity volume was generated by gridding the resistivity depth profiles. FIG. 10B is a map view depiction (view from below) of the resistive bodies with values greater than 2.0 ohm-m extracted from the gridded 1D resistivity volume. The resistive bodies are depicted in grey-scale indicating depth below the seafloor, with bodies shallower than 1000 m shown in white and bodies deeper than 3500 m shown in black.

Next, in accordance with step 106, the gridded 1D resistivity volume was simulated at each online receiver/transmitter combination using 3D forward electromagnetic simulation at each relevant frequency (here ⅛, ¼, and ½ Hz.) In accordance with step 108, the ratios between the phase of the electric field in the model data and that simulated from the gridded 1D resistivity volume were calculated for each offset for all online receiver/transmitter combinations at the ½ Hz frequency. Then, these ratio plots were registered in their proper geographic positions (step 110). FIG. 10C shows the ratio values calculated by dividing the phase of the original earth model by corresponding values generated from 3D electromagnetic simulation of the "gridded 1D resistivity volume" at ½ Hz. The inverted "V" ratio plots are depicted in grey-scale, with ratios ⅓ less resistive than background in white, same resistivity as background in grey, and ⅓ more resistive in black.

Figure 11A:
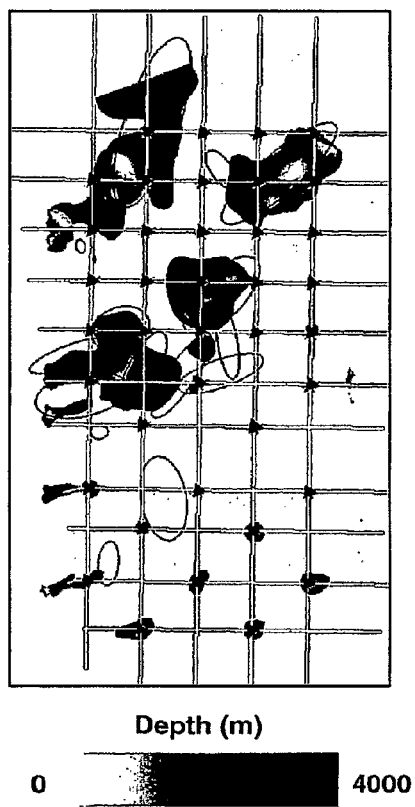
FIGS. 11A-D show map view depictions of the most resistive bodies extracted from a quasi-3D resistivity volume generated by the present inventive method from model calculations assuming the earth model of FIGS. 8A-B, with varying thresholds used for body extraction in FIGS. 11A-C and FIG. 8A showing which bodies in the earth model were detected or not detected.
Figure 11B:
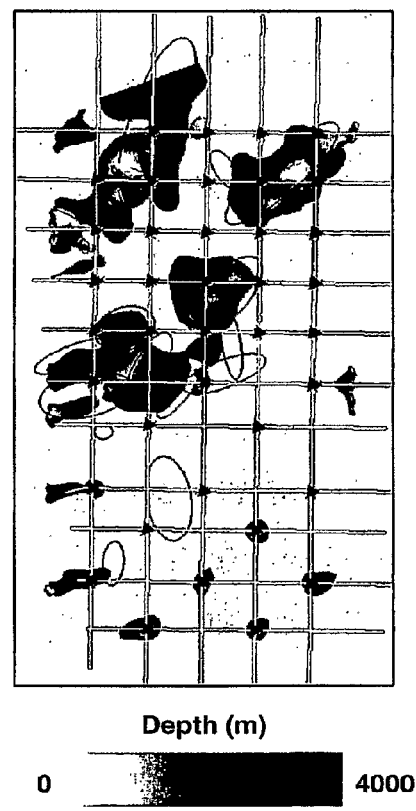
Figure 11D:
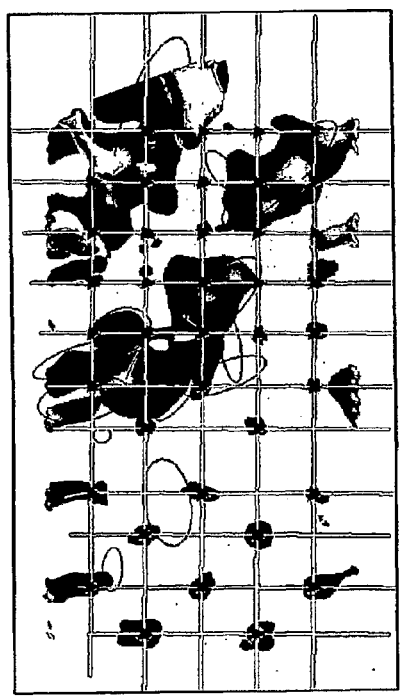
Figure 11D:
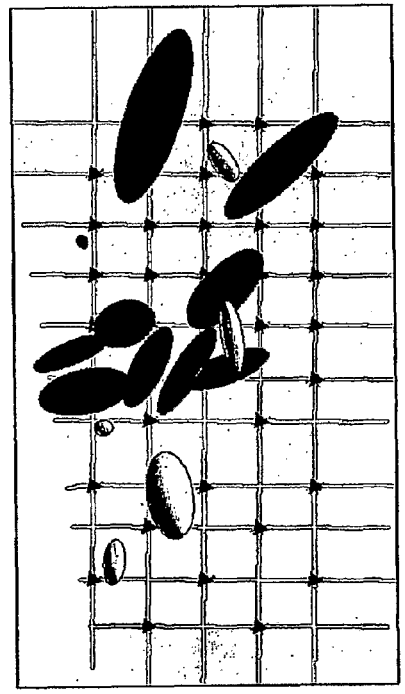
Figure 11C:
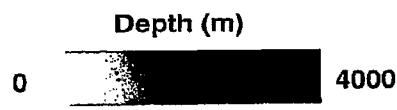

Next, in accordance with step 110 of FIG. 7, after the ratio plots from step 108 were registered in their proper geographic positions, they were then gridded (step 112), creating a ratio data volume, i.e. a unitless data volume based on scaled electromagnetic field (phase) data. Finally, in accordance with step 114, a quasi-3D resistivity volume was generated by multiplying the gridded 1D resistivity volume from step 104 by the ratio volume from step 112. FIGS. 11A, 11B, and 11C shows a map view depiction of the most resistive bodies extracted from the Q3DRV. The bodies are depicted in a grey-scale showing depth in meters below the seafloor, with depths of 0 m shown in white, and depths ≧4000 m shown in black. FIG. 11A shows only the bodies having resistivity values greater than 2.75 ohm m; the bodies in FIG. 11B have resistivity values greater than 2.5 ohm-m; and the bodies in FIG. 11C have resistivity values greater than 2.0 ohm-m. FIG. 11D summarizes which resistive bodies in the original model (FIGS. 8A-B) were detected using this methodology. In FIG. 11D, the nine bodies shown in black were detected at 2.75 ohm-m level; the one body in grey was detected at the 2.5 ohm-m level; and the five bodies in white were not detected at the 2.0 ohm-m level, even while false-positives were detected below most receivers.

Figure 12A:
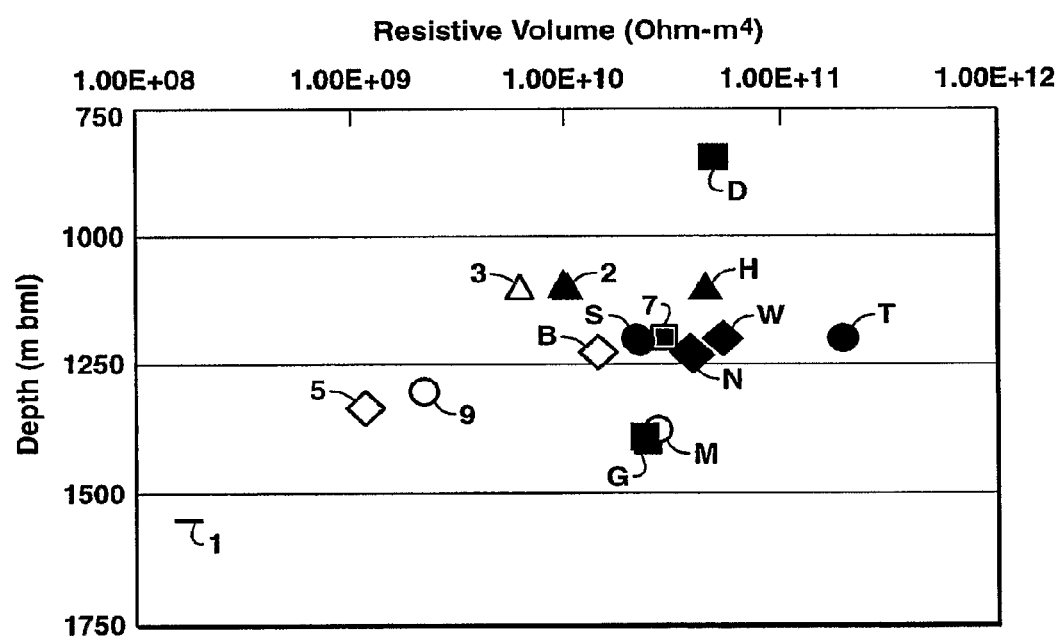
FIG. 12A is a cross plot summarizing reservoir detectability results using the present inventive method, and FIG. 12B identifies the symbols on the cross plot to particular bodies in the assumed earth model.
Figure 12B:
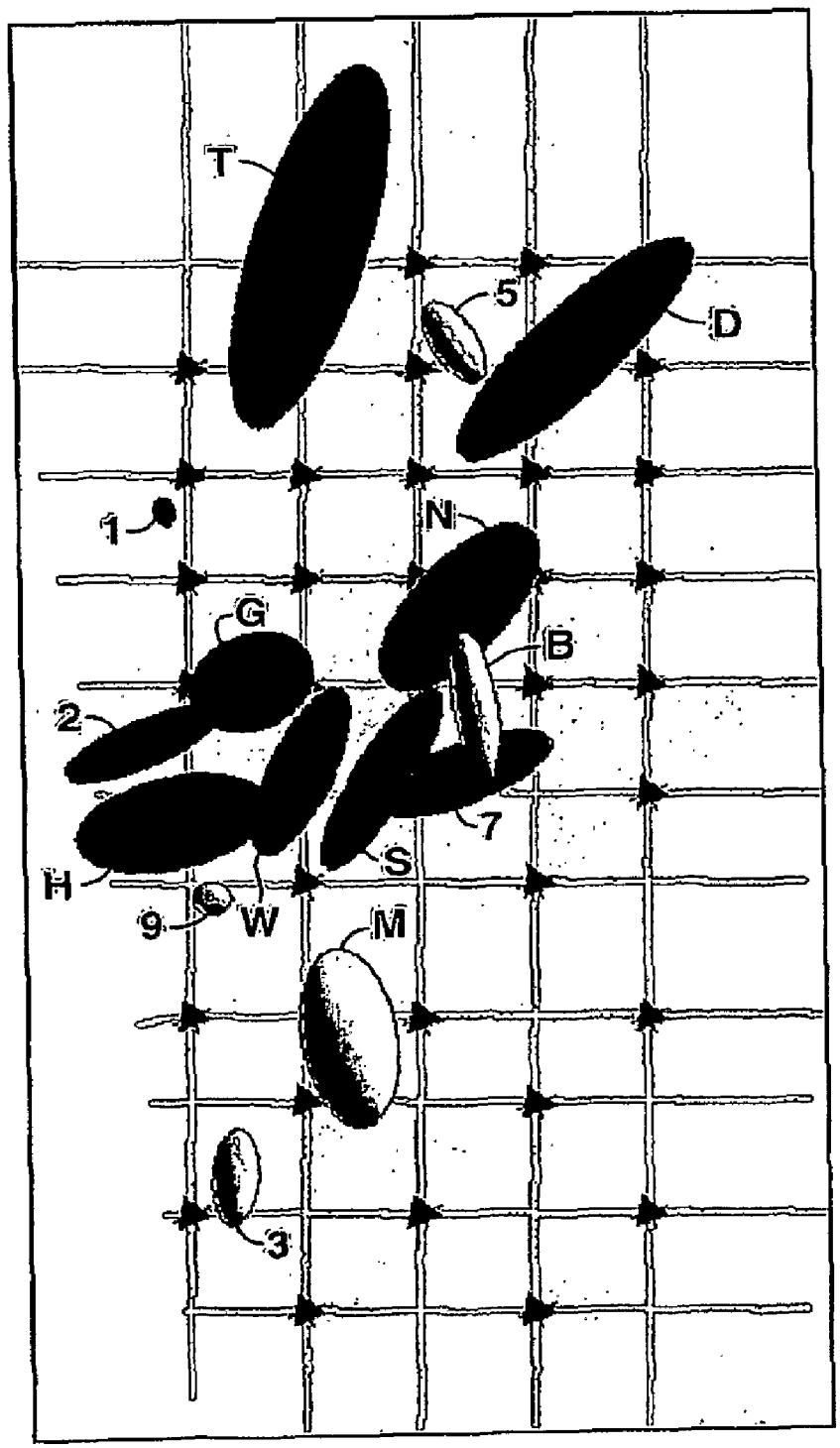

FIG. 12A is a cross plot of depth below the seafloor vs. resistive volume for the reservoirs in FIG. 11D, labeled as in FIG. 8A. Black symbols indicate detected reservoirs (connected regions in the resistivity data volume having resistivity >2.75 Ωm) that were detected with few or no false positives, gray symbols indicate reservoirs (regions having resistivity between 2.5 Ωm and 2.75 Ωm) detected with about 50% false positives, and white symbols represent reservoirs that were not detected even with false positives detected beneath most receivers. FIG. 12A shows that the present inventive method generally detects the largest, shallowest reservoirs (black), size of a reservoir being based on resistive volume, i.e. resistive thickness×length×width), and does not detect the smaller, deeper reservoirs (white). FIG. 12B is FIG. 11D with the resistive bodies labeled as in FIG. 8A. The key in FIG. 12A identifies each point in the cross plot to a particular body in FIG. 12B. Variations in detectability are due in part to the sparse-grid survey sampling. For example, reservoirs B and M may be expected to be detected with denser surveying or shifted receiver/towline positioning. When the example was repeated with amplitude data alone, the results were less successful, tending to show that incorporating phase measurements increases reservoir detectability and stability of the results.

Shallow Background Model Mapping

One of the most challenging issues in the analysis of MCSEM data is the masking effect of shallow resistive anomalies on deeper resistive anomalies. See PCT Patent Publication No. WO2006/096328. By slightly modifying the present inventive method, i.e., the method described in FIG. 7, it is possible to highlight deeper resistive anomalies that may exist below shallow resistive anomalies, by modeling the shallow anomalies and highlighting any residual anomalies. In this alternative embodiment of the present invention, 1D inversion (step 100 in FIG. 7) is applied to only the portion of the measured electromagnetic data that corresponds to one or more of the high-frequency harmonics of the fundamental frequency of the source's frequency spectrum. High-frequency harmonics are used in the 1D inversion because they do not penetrate deep in the earth, and can thus be used to characterize shallow subsurface resistivity. The lowest such frequency selected will typically be about 1.0 to 2.0 Hz. In a particular application, which harmonics are selected will usually be determined from available knowledge of the area and using standard techniques involving skin depth calculations. Economic hydrocarbon reservoirs are rarely found in the upper several hundred meters of earth due to problems such as insufficient maturation, leakage, producibility, and biodegradation. However, elevated resistivities associated with hydrocarbon systems can be present in the upper several hundred meters (e.g., shallow hazards). Even slightly elevated resistivities associated with these substances can mask underlying resistivities of potential economic importance unless properly modeled.

Figure 13:
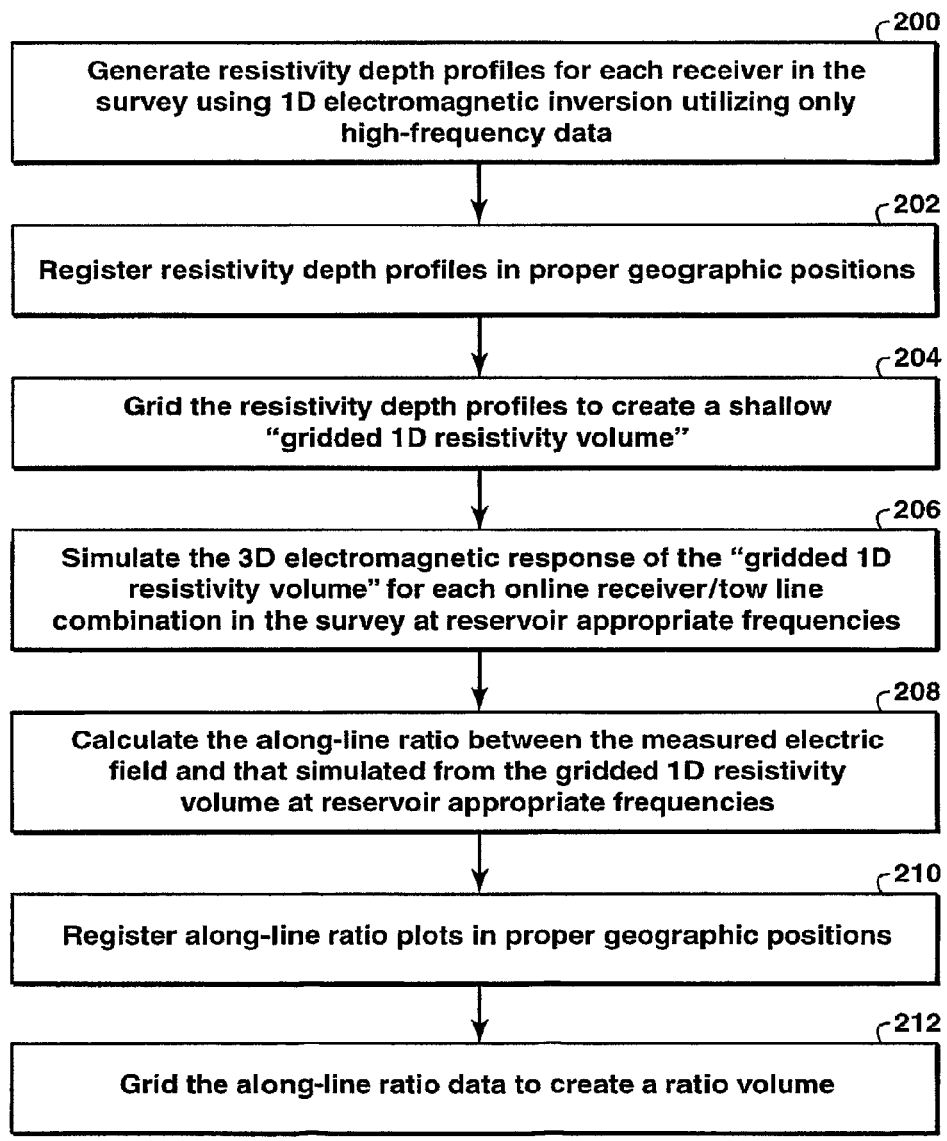
FIG. 13 is a flow chart showing basic steps whereby the present inventive method can used to generate shallow background model (SBM) mapping.

FIG. 13 is a flowchart of basic steps in this alternative embodiment of the invention. Steps 200, 202, and 204 are the same as the corresponding steps in FIG. 7, except that, as stated already, only high frequency data are used for the inversion computations of step 200.

At step 206 of FIG. 13, the 3D electromagnetic response of the gridded 1D resistivity volume is simulated for each receiver/tow line combination in the survey, or at least for a selected one or more receivers, using 3D forward electromagnetic modeling. The simulation is performed at a frequency selected to be low enough to penetrate to anticipated reservoir depths. The simulation may be repeated for a range of frequencies. These frequencies will all be lower than the frequency or frequencies used in the 1D inversion of step 200. Appropriate frequencies for reservoir detection are calculated using standard methods based on reservoir depth and background resistivity.

Steps 208, 210 and 212 are the same as the corresponding steps in FIG. 7. At step 208, the along-line ratio between the phase of the measured electric field and simulated electric field from the interpolated resistivity volume is calculated for all receiver/towline combinations. Ideally, along-line ratios of phase are used. However, since stable electromagnetic measurements of phase can be difficult to obtain, along-line ratios of amplitude can be substituted.

Next, at step 210, the ratio plots from step 208 are registered in their proper geographic positions. Preferably, but not necessarily, zero-offset ratio data is placed at receiver locations, with ratio plotting continuing below tow lines at depth equals half transmitter/receiver offset, utilizing the inverted "V" style plots. An example of locating a display point is location 33 in FIG. 15.

Next, at step 212, the along-line ratio data are gridded using standard techniques to form a ratio volume.

Figure 14:
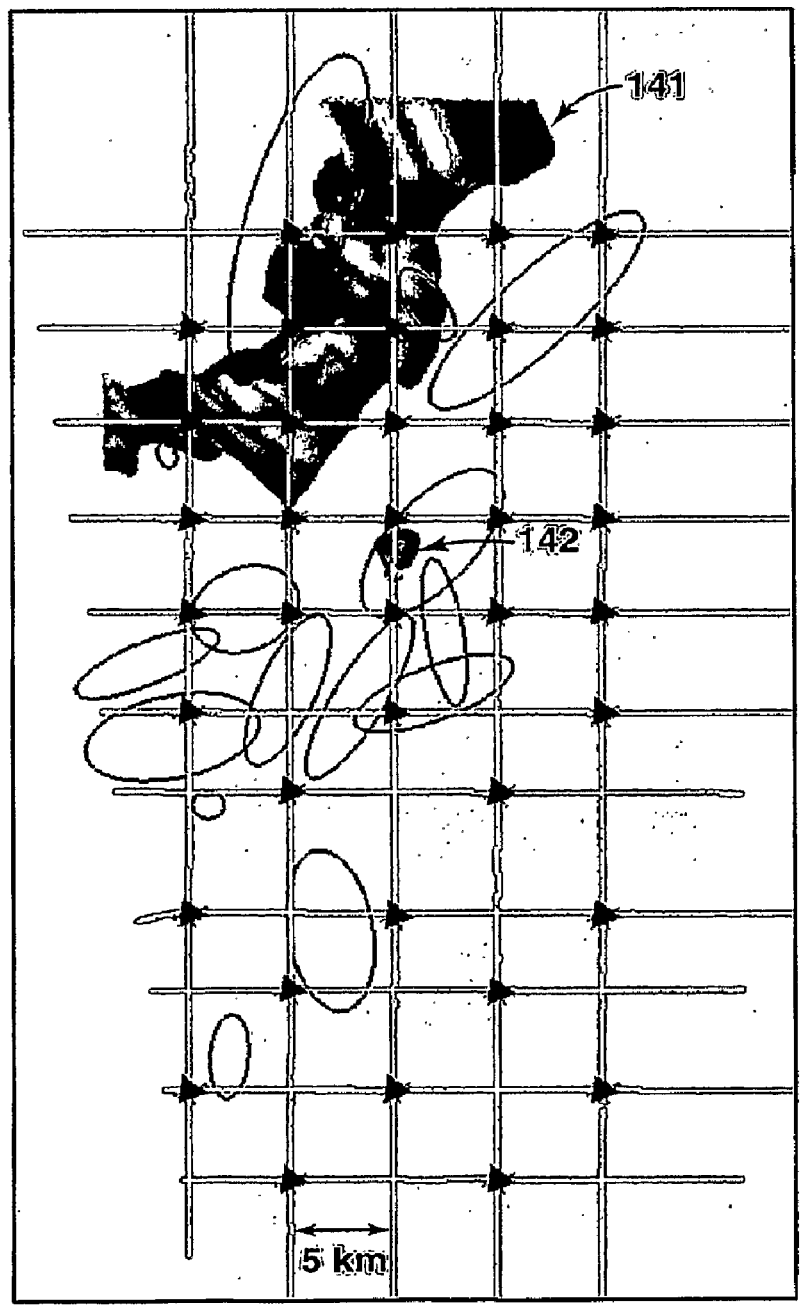
FIG. 14 is a map view depiction of resistive channel-form feature in measured data detected using SBM mapping.

An application of this Shallow Background Model Mapping embodiment of the invention is illustrated by FIG. 14. FIG. 14 shows a map view depiction of two high-resistivity bodies extracted from shallow background model mapping in measured data. The 1D inversions were done (step 200) on 2.5 Hz inline parallel amplitude data ($E_x$). After simulating the gridded 1D shallow background model at 0.5 Hz (step 206), along-line amplitude ratios were calculated (step 208). Next, the bodies with the highest deviation from the simulated shallow background model of step 206 were extracted from the ratio volume of step 212; i.e., ratios above a selected threshold value were extracted. The criterion selected for FIG. 14 was that extracted bodies must have electric field ratios at least 70% higher than the simulated shallow background model at 0.5 Hz. In other words, a ratio in the ratio data volume of step 212 had to be $\geq 1.70$ in order to become part of an extracted body. The depths below the seafloor of these bodies are depicted in grey-scale, with depths of 2000 m or less shown in white, and depths $\geq 4000$ m shown in black. Based on seismic and borehole data, the channel-form feature 141 in the northwest (upper left) corresponds to thickening of lower Tertiary strata, including some thin, resistive limestones and marls, into a late Cretaceous graben. The small body 142 in the central portion of the survey corresponds to one of the larger drilled and known discoveries within the survey. (The resistive body polygons of the model of FIGS. 8A-B, which model was also used for FIG. 14, were generated based on actual discoveries and leads from a certain region.)

The foregoing application is directed to particular embodiments of the present invention for the purpose of illustrating it. It will be apparent, however, to one skilled in the art, that many modifications and variations to the embodiments described herein are possible. For example, the invention is described in terms of marine CSEM survey data, but the method can be applied to data collected on land or using airborne technique (in which case the term towline is understood to be a source position line). The computations of the present invention are preferably performed at least partly on a computer, i.e., computer-implemented embodiments of the present inventive method are preferred, but not essential. All such modifications and variations are intended to be within the scope of the present invention, as defined in the appended claims.

The invention claimed is:

1. A method for generating a three-dimensional (3D) resistivity model for a subsurface region from one-dimensional (1D) inversion of measured electromagnetic field data from a controlled-source electromagnetic survey of the region, said method comprising:
   (a) generating an initial resistivity data volume for the subsurface region through 1D inversion of the measured electromagnetic field data said 1D referring to the subsurface region's vertical dimension;
   (b) solving Maxwell's electromagnetic field equations in three dimensions, assuming the initial resistivity data volume and a selected frequency from the survey source's frequency spectrum, for selected source/receiver locations from the survey, thereby producing calculated electromagnetic field values corresponding to measured survey data;
(c) decomposing the measured data to the frequency domain and selecting the component of the data corresponding to the selected frequency;
(d) dividing a measured field value from the selected data component by a calculated field value, for different source-receiver pairs along a plurality of source towlines, yielding a set of ratios;
(e) assigning an (x,y,z) position to each ratio, in consideration of the locations of the source and receiver pair associated with each ratio, thereby creating a ratio data volume; and
(f) multiplying the initial resistivity data volume by a function of the ratio data volume, location-by-location, to generate a 3D resistivity model corresponding to the selected frequency.

2. The method of claim 1, wherein the initial resistivity data volume is generated from one or more 1D resistivity depth profiles, each profile computed by performing a one-dimensional electromagnetic inversion calculation, said inversion being solving Maxwell's electromagnetic field equations using measured data from the survey and survey source and receiver locations and source parameters, with resistivity as a function of vertical position being the unknown quantities in the calculation.

3. The method of claim 2, wherein at least two resistivity depth profiles are calculated for each receiver position in the survey that lies along a source towline, i.e. for each "online" receiver, one profile using measured data from approaching source positions in its inversion calculation, the other using data from receding source positions.

4. The method of claim 2, wherein the initial resistivity data volume is generated by positioning the 1D resistivity depth profiles in relation to their corresponding receiver positions on a 3D grid.

5. The method of claim 4, wherein the data for the 1D inversion consists of at least one frequency component of the measured survey data after decomposition to the frequency domain.

6. The method of claim 1, wherein a simulation calculation is performed for each online receiver and source location combination in the survey.

7. The method of claim 1, further comprising repeating steps (b)-(e) for at least one additional frequency pre-selected from the survey source's frequency spectrum.

8. The method of claim 7, wherein a 3D resistivity model is generated for each frequency involved in the 1D inversion.

9. The method of claim 1, further comprising gridding the initial resistivity data volume and the ratio data volume to identical discrete grids, using interpolation as necessary, before multiplying them to generate the 3D resistivity model.

10. The method of claim 1, wherein the (x,y,z) position for a ratio associated with a source-receiver pair is determined by:
(a) locating the position laterally (x,y) to be half way between the (x,y) locations of the source and receiver; and
(b) taking z, which is distance below the receiver's vertical position to be equal to one-half of the lateral source-to-receiver spacing.

11. The method of claim 1, wherein the measured survey data used in the method are selected from a group consisting of: (a) electric field amplitude data; (b) magnetic field amplitude data; (c) electric field phase data; (d) magnetic field phase data; (e) any combination of the preceding.

12. The method of claim 1, wherein the measured survey data used in the method are selected from a group consisting of: (a) vertical electric field amplitude data; (b) vertical electric field phase data; (c) any combination of the preceding.

13. The method of claim 1, wherein said function of the ratio data volume is the ratio data volume itself.

14. The method of claim 1, further comprising updating the initial resistivity data volume in step (a) with the 3D resistivity model from step (f), and repeating steps (b)-(f).

15. The method of claim 14, further comprising continuing to update the resistivity data volume and iterating until a pre-selected convergence criterion is met or other stopping point is reached.

16. A method for emphasizing deeper resistive anomalies over masking effects of shallow resistive anomalies arising in measured electromagnetic field data from a controlled-source electromagnetic survey of a subsurface region, said method comprising:
(a) decomposing the measured data into components in the frequency domain;
(b) selecting one or more data components corresponding to frequencies higher than a minimum frequency, said minimum frequency being chosen to provide a pre-selected degree of shallow penetration of said subsurface region;
(c) generating an initial resistivity data volume for the subsurface region through one dimensional (1-D) 1D inversion of the selected high frequency components of the measured electromagnetic field data, wherein said 1D refers to the subsurface region's vertical dimension;
(d) solving Maxwell's electromagnetic field equations in three dimensions, assuming the initial resistivity data volume and a selected low frequency from the survey source's frequency spectrum, for selected source/receiver locations from the survey, said low frequency being selected for its ability to penetrate to a pre-selected depth in the subsurface region thereby producing calculated electromagnetic field values;
(e) dividing a measured electromagnetic field value from the frequency-domain data component associated with the selected low frequency by a calculated electromagnetic field value, for different source-receiver pairs along a plurality of source towlines, yielding a set of ratios;
(f) assigning an (x,y,z) position to each ratio, in consideration of the locations of the source and receiver pair associated with each ratio, thereby creating a ratio data volume; and
(g) defining resistive objects in the ratio data volume by selecting cells in the volume having scaled values above a pre-selected threshold.

17. The method of claim 16, wherein the initial resistivity data volume is generated from one or more 1D resistivity depth profiles, each profile computed by performing a one-dimensional electromagnetic inversion calculation, said 1D electromagnetic inversion calculation being solving Maxwell's electromagnetic field equations using measured data from the survey and survey source and receiver locations and source parameters, with resistivity as a function of vertical position being the unknown quantities in the calculation.

18. The method of claim 16, further comprising transferring the ratio data volume to a selected discrete grid composed of cells, using interpolation as necessary to assign a ratio value to each cell.

19. A method for producing hydrocarbons from a subsurface region, comprising:
- (a) obtaining measured electromagnetic field data from a controlled-source electromagnetic survey of the subsurface region;
- (b) generating an initial resistivity data volume for the subsurface region through 1D inversion of the measured electromagnetic field data, wherein said 1D refers to the subsurface region's vertical dimension;
- (c) solving Maxwell's electromagnetic field equations in three dimensions, assuming the initial resistivity data volume and a selected frequency from the survey source's frequency spectrum, for selected source/receiver locations from the survey, thereby producing calculated electromagnetic field values corresponding to measured survey data;
- (d) decomposing the measured data to the frequency domain and selecting the component of the data corresponding to the selected frequency;
- (e) dividing a measured field value from the selected data component by a calculated field value, for different source-receiver pairs along a plurality of source towlines, yielding a set of ratios;
- (f) assigning an (x,y,z) position to each ratio, in consideration of the locations of the source and receiver pair associated with each ratio, thereby creating a ratio data volume;
- (g) multiplying the initial resistivity data volume by a function of the ratio data volume, location-by-location, to generate a 3D resistivity model corresponding to the selected frequency; and
- (h) producing hydrocarbons from hydrocarbon-bearing formations represented by resistive anomalies discovered by inspection of the 3D resistivity model of the previous step.

20. The method of claim 19, wherein the initial resistivity data volume is generated from one or more 1D resistivity depth profiles, each profile computed by performing a one-dimensional electromagnetic inversion calculation, said inversion being solving Maxwell's electromagnetic field equations using measured data from the survey and survey source and receiver locations and source parameters, with resistivity as a function of vertical position being the unknown quantities in the calculation.

* * * * *